(12) United States Patent
Horiuchi et al.

(10) Patent No.: US 11,337,242 B2
(45) Date of Patent: May 17, 2022

(54) BASE STATION, TERMINAL AND COMMUNICATION METHOD

(71) Applicant: Panasonic Intellectual Property Corporation of America, Torrance, CA (US)

(72) Inventors: Ayako Horiuchi, Kanagawa (JP); Hidetoshi Suzuki, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 55 days.

(21) Appl. No.: 15/773,528

(22) PCT Filed: Sep. 12, 2016

(86) PCT No.: PCT/JP2016/004130
§ 371 (c)(1),
(2) Date: May 3, 2018

(87) PCT Pub. No.: WO2017/077677
PCT Pub. Date: May 11, 2017

(65) Prior Publication Data
US 2018/0324841 A1 Nov. 8, 2018

(30) Foreign Application Priority Data

Nov. 6, 2015 (JP) .............................. JP2015-218437

(51) Int. Cl.
*H04W 72/12* (2009.01)
*H04L 5/00* (2006.01)
(Continued)

(52) U.S. Cl.
CPC .......... *H04W 72/1289* (2013.01); *H04L 1/16* (2013.01); *H04L 5/0055* (2013.01); *H04W 72/04* (2013.01); *H04W 72/12* (2013.01); *H04W 88/08* (2013.01)

(58) Field of Classification Search
None
See application file for complete search history.

(56) References Cited

U.S. PATENT DOCUMENTS

| 2015/0244510 A1* | 8/2015 | Chae et al. ............ H04L 5/0055 |
| 2015/0358124 A1* | 12/2015 | Suzuki et al. ........ H04L 1/1861 |
| 2016/0174194 A1* | 6/2016 | Suzuki ................. H04L 5/0053 370/312 |

FOREIGN PATENT DOCUMENTS

| EP | 2 861 029 | 4/2015 |
| EP | 2950600 | 12/2015 |
| WO | 2014/115781 | 7/2014 |

OTHER PUBLICATIONS

Extended European Search Report, dated Oct. 8, 2018, for the corresponding European Patent Application No. 16861755.3-1219 / 3373675, 8 pages.

(Continued)

*Primary Examiner* — Chi H Pham
*Assistant Examiner* — Raul Rivas
(74) *Attorney, Agent, or Firm* — Seed IP Law Group LLP

(57) ABSTRACT

A signal assignment unit (105) assigns a downlink control signal including resource assignment information of a PDSCH to a downlink resource. A specification unit (108) specifies a PUCCH resource using an offset value set to either a first PRB set or a second PRB set when the downlink control signal is disposed to spread over the first PRB set and the second PRB set. A signal separation unit (109) separates an ACK/NACK signal included in the specified PUCCH (Continued)

resource from a received signal from a terminal to which the downlink control signal has been transmitted.

13 Claims, 12 Drawing Sheets

(51) Int. Cl.
  *H04W 72/04* (2009.01)
  *H04L 1/16* (2006.01)
  *H04W 88/08* (2009.01)

(56) References Cited

OTHER PUBLICATIONS

3GPP TR 36.888 V12.0.0, "3$^{rd}$ Generation Partnership Project; Technical Specification Group Radio Access Network; Study on provision of low-cost Machine-Type Communications (MTC) User Equipments (UEs) based on LTE (Release 12)," Jun. 2013, 55 pages.

Samsung, "UCI Transmission Aspects," R1-155433, 3GPP TSG RAN WG1 #82bis, Agenda Item: 7.2.1.5, Malmo, Sweden, Oct. 5-9, 2015, 3 pages.

Panasonic, "Email discussion [82b-02] on Search space design for eMTC," R1-157476, 3GPP TSG RAN WG1 Meeting #82bis, Agenda Item: 7.2.1.2, Malmö, Sweden, Oct. 5-9, 2015, 36 pages.

International Search Report, dated Oct. 25, 2016, for the corresponding International Application No. PCT/JP2016/004130, 4 pages.

Huawei, HiSilicon, "Remaining details of PUCCH configuration," R1-154605, Agenda Item: 7.2.1.5, 3GPP TSG RAN WG1 Meeting #82bis, Beijing, China, Aug. 24-28, 2015, 5 pages.

Huawei, HiSilicon, "Remaining details of PUCCH transmission for MTC UEs," R1-155113, Agenda Item: 7.2.1.5, 3GPP TSG RAN WG1 Meeting #82bis, Malmo, Sweden, Oct. 5-9, 2015, 7 pages.

ZTE, "Remaining issues on PUCCH for MTC enhancement," R1-155239, Agenda Item: 7.2.1.5, 3GPP TSG RAN WG1 Meeting #82bis, Malmö, Sweden, Oct. 5-9, 2015, 6 pages.

Indian Examination Report dated Nov. 23, 2020, for the corresponding Indian Patent Application No. 201827016602, 7 pages.

* cited by examiner

BASE STATION, TERMINAL AND COMMUNICATION METHOD

TECHNICAL FIELD

The present disclosure relates to a base station, a terminal, and a communication method.

BACKGROUND ART

In recent years, Machine-Type Communications (MTC), which uses a cellular network, has been under study (see, e.g., Non-Patent Literature (hereinafter, referred to as "NPL") 1). The applications of MTC possibly include automatic meter reading of smart meters, and/or the inventory control, logistics management and/or pet and domestic animal control using position information, and mobile payment and/or the like. In MTC, it is expected that a terminal that supports MTC (may be referred to as an MTC terminal or MTC UE) is connected to a network. Although a large number of MTC terminals are arranged, it is predicted that the amount of traffic of each one of the MTC terminals is not so large. Therefore, the MTC terminals are desired to be low costs and low power consumption. Moreover, the MTC terminal is possibly placed in the underground or the like of a building to which an electric wave is unlikely to reach, so that coverage enhancement is also in demand.

In extension of LTE-Advanced, which has been standardized by 3GPP, limiting the resource used by an MTC terminal for communication to be not greater than 6 physical resource blocks (PRBs) regardless of a system band has been under study for the purpose of achieving low-costs for MTC terminals. When the system band is wider than 6 PRBs, the MTC terminal receives only part of the system band and performs transmission and reception. The PRB used for transmission and reception is changeable by retuning. This resource not greater than 6 PRBs is called "Narrowband." It is defined that this Narrowband is composed of contiguous PRBs.

Moreover, studies have been conducted on using MPDCCH (PDCCH for MTC) obtained by extending Enhanced Physical Downlink Control CHannel (EPDCCH), as a control signal for MTC terminals. MPDCCH is mapped in a PDSCH region in Narrowband. Moreover, in MTC, a method in which MPDCCH is assigned to all 6 PRB pairs included in Narrowband has been under study for coverage enhancement. In EPDCCH, there are 16 Enhanced Resource Element Groups (EREGs) per PRB pair, and when the number of EREGs per Enhanced CCE (ECCE) is set to 4, the number of ECCEs of 6 PRB pairs becomes 24 ECCEs. In addition, ECCE is a unit for assigning EPDCCH, and EREG is a unit used for mapping ECCE to a Resource Element (RE). Moreover, a PRB pair is a resource unit and is composed of 1 subframe (time domain)×12 subcarriers (frequency), and when a resource on only the frequency domain is to be indicated, the resource may only be referred to as "PRB."

For MPDCCH to be configured for MTC terminals, mapping of MPDCCH composed of 4 PRB pairs (4 PRB set) or MPDCCH composed of 2 PRB pairs (2 PRB set) in 6 PRB pairs has been under study. Moreover, 1, 2, 4, 8, 16, and 24 have been discussed as the aggregation levels of MPDCCH. No that, each of the aggregation levels indicates the number of ECCEs forming MPDCCH. For aggregation levels=1, 2, 4, and 8, MPDCCH is mapped in 4 PRB set or 2 PRB set in a closed manner, and for aggregation level=16, one MPDCCH is mapped to all 16 ECCEs in 4 PRB set.

Furthermore, for an MTC terminal with low channel quality, mapping of one MPDCCH to all 6 PRB pairs in Narrowband, which overlap with an MPDCCH resource composed of 4 PRB pairs and 2 PRB pairs has been under study. In this case, aggregation level=24, which may be simply referred to also as "24 ECCEs."

CITATION LIST

Non-Patent Literature

NPL 1
3GPP TR 36.888 V12.0.0, and "Machine-Type Communications (MTC) User Equipments (UEs) based on LTE (Release 12)," June 2013.

SUMMARY OF INVENTION

Technical Problem

As with the traditional terminals, an MTC terminal receives MPDCCH, which is a downlink (DL) control signal, receives the downlink data (PDSCH) indicated by MPDCCH, and transmits an ACK/NACK signal of the received result via PUCCH, which is an uplink (UL) control signal. In order for each MTC terminal to identify a PUCCH resource for an MTC terminal in this case, use of an offset (called "N_pucch") configured for each PRB set, as in the case of EPDCCH, has been discussed.

However, no studies have been conducted on how to define the offset (N_pucch) for "24 ECCEs" for mapping one MPDCCH to all 6 PRB pairs in Narrowband.

Thus, an aspect of the present disclosure provides a base station, a terminal, and a communication method each making it possible to efficiently identify a PUCCH resource of a case where one MPDCCH is mapped to all 6 PRB pairs in Narrowband.

Solution to Problem

A base station according to an aspect of the present disclosure includes: a signal assignment section that assigns a downlink control signal to a downlink resource, the downlink control signal including resource allocation information on Physical Downlink Shared Channel (PDSCH); an identifying section that identifies a Physical Uplink Control Channel (PUCCH) resource based on the downlink resource to which the downlink control signal has been assigned, the PUCCH resource being a resource to which an ACK/NACK signal for the PDSCH is assigned; and a signal separating section that separates the ACK/NACK signal included in the identified PUCCH resource from a received signal from a terminal to which the downlink control signal has been transmitted, in which the downlink resource is composed of a plurality of PRB pairs, and any of a first PRB set and a second PRB set is assigned to each of the plurality of PRB pairs, and in a case where the downlink control signal is mapped over the first PRB set and the second PRB set, the identifying section identifies the PUCCH resource, using an offset value configured for any of the first PRB set and the second PRB set.

A terminal according to an aspect of the present disclosure includes: a receiving section that receives a downlink control signal including resource allocation information on Physical Downlink Shared Channel (PDSCH); and an identifying section that identifies a Physical Uplink Control Channel (PUCCH) resource based on a downlink resource to which the downlink control signal has been assigned, the PUCCH resource being a resource to which an ACK/NACK signal for the PDSCH is assigned; and a signal assignment section that assigns the ACK/NACK signal to the identified PUCCH resource, in which the downlink resource is composed of a plurality of PRB pairs, and any of a first PRB set and a second PRB set is assigned to each of the plurality of PRB pairs, and in a case where the downlink control signal is mapped over the first PRB set and the second PRB set, the identifying section identifies the PUCCH resource, using an offset value configured for any of the first PRB set and the second PRB set.

It should be noted that general or specific embodiments may be implemented as a system, an apparatus, a method, an integrated circuit, a computer program or a storage medium, or any selective combination of the system, the apparatus, the method, the integrated circuit, the computer program, and the storage medium.

According to an aspect of the present disclosure, it is made possible to efficiently identify a PUCCH resource of a case where one MPDCCH is mapped to all 6 PRB pairs in Narrowband.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS (Knowledge as Foundation of Present Disclosure)

Use of an offset (N_pucch) for identifying a PUCCH resource directed to an MTC terminal makes it possible to distinguish between a traditional terminal PUCCH resource and an MTC terminal PUCCH resource and thus to avoid a collision of PUCCH resources. Moreover, N_pucch can avoid a collision of PUCCH resources between MTC terminals of different repetition levels when an indication is given for each repetition level. Thus, a distance problem that occurs when signals of terminals having mutually different distances to a base station are multiplexed can be solved.

In N_pucch for a single MTC, a collision of PUCCH resources between a plurality of MTC terminals of the same repetition level cannot be avoided, however.

In this respect, for PUCCH resources of MTC terminals of the same repetition level, it may be possible to identify a resource of PUCCH format 1a/1b for transmitting an ACK/NACK based on mapping of a DL control signal (MPDCCH) by which DL assignment indicating transmission of a DL data signal as in the case of EPDCCH.

In EPDCCH, offset $N_{PUCCH,q}^{(e1)}$ (hereinafter, referred to as "N_pucch, q" for simplicity) is configured for each EPDCCH-PRB-set q=0, 1, and a PUCCH resource is identified from an ECCE number. In EPDCCH, a resource (resource number) of PUCCH format 1a/1b is identified by the following expressions.

$$\text{distributed assignment } n_{PUCCH}^{(1,\tilde{p}_0)} = \qquad \text{[Expression 1]}$$
$$n_{ECCE,q} + \Delta_{ARO} + N_{PUCCH,q}^{(e1)}$$
$$\text{localized assignment } n_{PUCCH}^{(1,\tilde{p}_0)} =$$
$$\left\lfloor \frac{n_{ECCE,q}}{N_{RB}^{ECCE,q}} \right\rfloor \cdot N_{RB}^{ECCE,q} + n' + \Delta_{ARO} + N_{PUCCH,q}^{(e1)}$$

In Expression 1, $n_{ECCE,\ q}$ represents an offset by the original ECCE number to which a DCI (Downlink Control Information) is mapped in the q-th EPDCCH PRB set. Moreover, $\Delta_{ARO}$ represents an offset indicated by 2-bit ARO (ACK/NACK Resource Offset) included in the DCI, and the offset takes values of −2, −1, 0, and +2 in case of FDD. Moreover. $N_{PUCCH,\ q}^{(e1)}$ is indicated for each terminal by a higher layer. Moreover, $N_{RB}^{ECCE,q}$ represents the number of ECCEs per RB, and n' represents an offset based on an antenna port.

Figure 1:
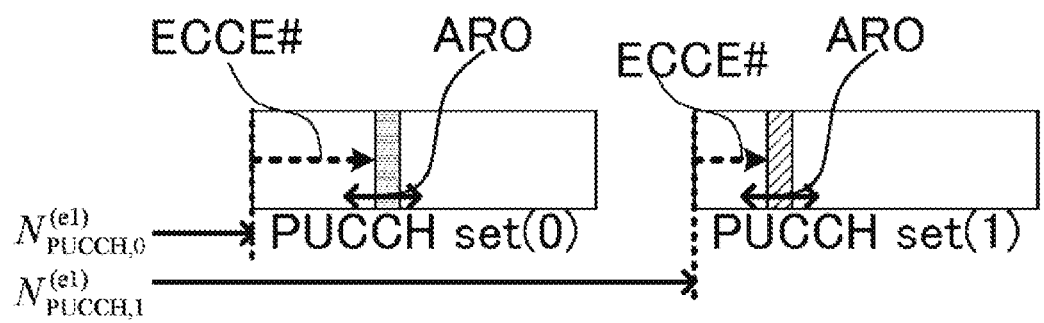
FIG. 1 is a conceptual diagram of a PUCCH resource.

FIG. 1 is a conceptual diagram of the PUCCH resource mentioned above.

As illustrated in FIG. 1, by configuring offset values $N_{PUCCH,0}^{(e1)}$ and $N_{PUCCH,1}^{(e1)}$ to have values distant from each other, the PUCCH resources corresponding to the respective PRB sets are mapped so as not to overlap with each other, so that a collision of PUCCH resources can be avoided. Moreover, by configuring $N_{PUCCH,0}^{(e1)}$ and $N_{PUCCH,\ 1}^{(e1)}$ to have values close to each other, the PUCCH resources corresponding to the respective PRB sets are mapped so as to overlap with each other, so that the entirety of PUCCH resources can also be reduced.

It is conceivable to identify a PUCCH resource for MPDCCH as in the case of EPDCCH. In this case, for the MPDCCH to be mapped in a PRB set composed of 4 PRB pairs or 2 PRB pairs, a PUCCH resource can be identified by a method similar to the method for EPDCCH mentioned above.

There is, however, a problem in that the same method as that for EPDCCH cannot be applied for a PUCCH resource of a case where MPDCCH is mapped to 24 ECCEs in Narrowband (i.e., a case where MPDCCH is mapped over 4 PRB set and 2 PRB set), and it is thus impossible to identify a resource. Note that, although it is conceivable to separately indicate an offset corresponding to MPDCCH of 24 ECCEs, the amount of signaling increases in this case.

Hereinafter, a description will be given of a method for identifying a PUCCH resource without any increase in the amount of signaling in a case where MPDCCH is mapped to 24 ECCEs in a narrowband.

Hereinafter, a detailed description will be given of an embodiment of the present disclosure with reference to the accompanying drawings.

[Description of MTC 24 ECCEs]

As mentioned above, MPDCCH of 24 ECCEs used in MTC is mapped to all REs which are included in 6 PRB pairs in Narrowband and which are available for MPDCCH. Hereinafter, a description will be given of two Options 1 and 2 each conceivable as a mapping method for MPDCCH of 24 ECCEs.

Figure 2A:
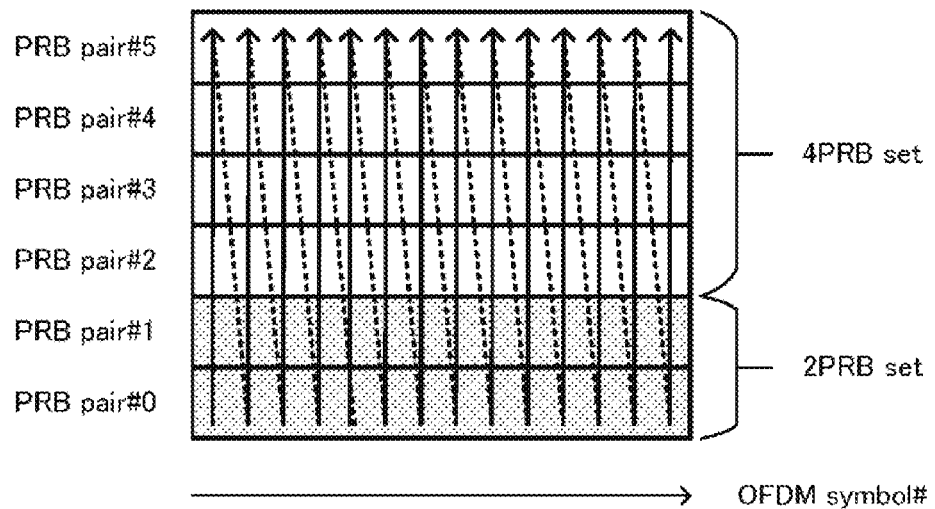
FIG. 2A is a diagram illustrating an example of an MPDCCH mapping method (Option 1)
Figure 2B:
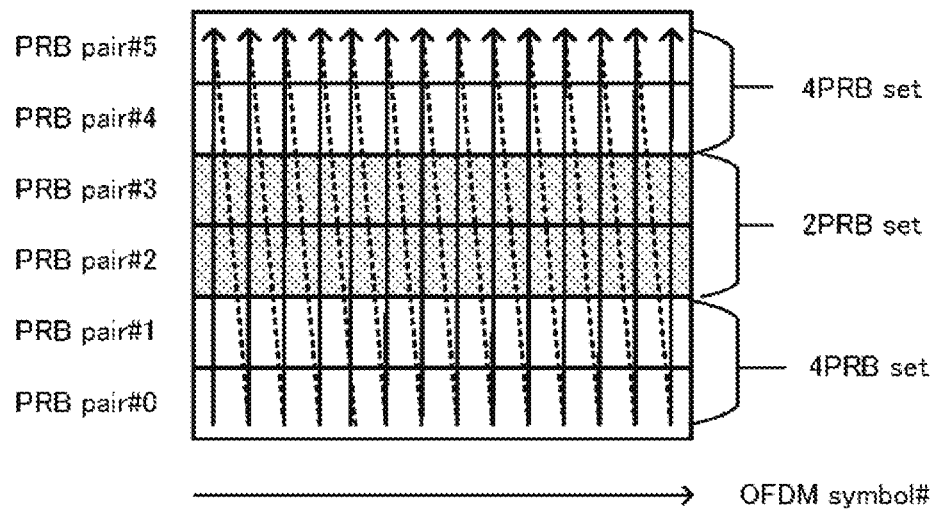
FIG. 2B is another diagram illustrating another example of the MPDCCH mapping method (Option 1)

(Option 1: FIGS. 2A and 2B)

In Option 1, MPDCCH of 24 ECCEs is mapped to a frequency first (Frequency first). More specifically, in Narrowband, a symbol sequence of MPDCCH is mapped from an OFDM symbol with a low OFDM symbol number in ascending order of frequency while vertically crossing over PRB pairs, and then moves to the next OFDM symbol and is mapped in ascending order of frequency while vertically crossing over PRB pairs, likewise.

FIGS. 2A and 2B illustrate an MPDCCH mapping example of Option 1.

In FIG. 2A, 2 PRB set is assigned to PRB pairs #0 and #1, and 4 PRB set is assigned to PRB pairs #2 to #5. In FIG. 2A, MPDCCH of 24 ECCEs is mapped to all REs available for MPDCCH without distinction between 2 PRB set resources (PRB pairs #0, #1) and 4 PRB set resources (PRB pairs #2 to #5).

In FIG. 2B, 2 PRB set is assigned to PRB pairs #2 and #3, and 4 PRB set is assigned to PRB pairs #0, #1, #4, and #5. In FIG. 2B, as in FIG. 2A, MPDCCH of 24 ECCEs is mapped to all REs available for MPDCCH without distinction between 2 PRB set resources (PRB pairs #2, #3) and 4 PRB set resources (PRB pairs #0, #1, #4, #5).

Figure 3A:
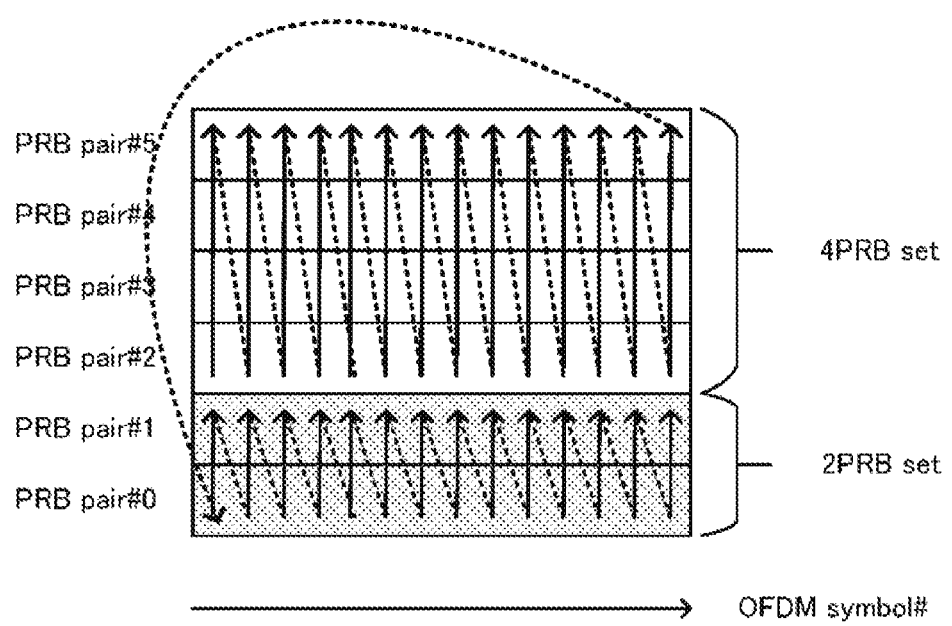
FIG. 3A is a diagram illustrating an example of an MPDCCH mapping method (Option 2)
Figure 3B:
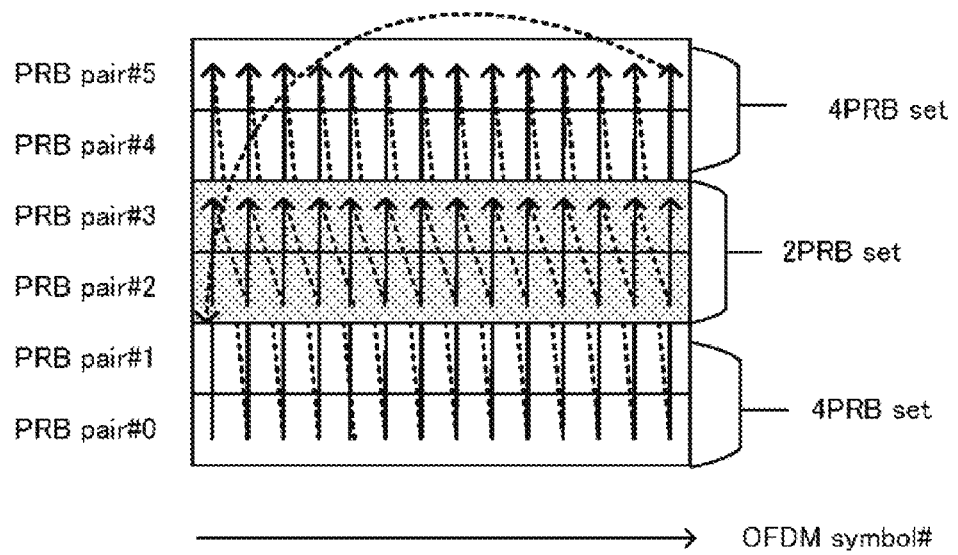
FIG. 3B is another diagram illustrating the example of the MPDCCH mapping method (Option 2)

(Option 2: FIGS. 3A and 3B)

In Option 2, MPDCCH of 24 ECCEs is mapped to an MPDCCH PRB set first in Narrowband. Accordingly, the mapping order of MPDCCH is changed depending on which PRB pair the PRB set is assigned to.

FIGS. 3A and 3B illustrate an MPDCCH mapping example of Option 2 in which MPDCCH is mapped to 4 PRB set, first. More specifically, MPDCCH is first mapped to REs in the 4 PRB set and then mapped to REs in 2 PRB set. Note that, mapping in 4 PRB set and 2 PRB set is performed Frequency first as in EPDCCH. More specifically, in PRB pairs in a PRB set, the symbol sequence of MPDCCH is mapped from an OFDM symbol with a low OFDM symbol number in ascending order of frequency while vertically crossing over PRB pairs, and then moves to the next OFDM symbol and is mapped in ascending order of frequency while vertically crossing over PRB pairs, likewise.

In FIG. 3A, 2 PRB set is assigned to PRB pairs #0 and #1, and 4 PRB set is assigned to PRB pairs #2 to #5. Accordingly, in FIG. 3A. MPDCCH of 24 ECCEs is mapped to PRB pairs #2 to #5 to which 4 PRB set is assigned, and then mapped to PRB pairs #0 and #1 to which 2 PRB set is assigned.

In FIG. 3B, 2 PRB set is assigned to PRB pairs #2 and #3, and 4 PRB set is assigned to PRB pairs #0, #1, #4, and #5. Accordingly, in FIG. 3B, MPDCCH of 24 ECCEs is mapped to PRB pairs #0, #1, #4, and #5 to which 4 PRB set is assigned, and then mapped to PRB pairs #2 and #3 to which 2 PRB set is assigned.

Note that, hereinafter, in any of Options, the minimum ECCE number of a case where MPDCCH of 24 ECCE is detected is assumed to be $n_{ECCE,q}=0$.

[Overview of Communication System]

A communication system according to each embodiment of the present disclosure includes base station 100 and terminal 200 each supporting the LTE-Advanced system, for example. Terminal 200 is an MTC terminal, for example.

Figure 4:
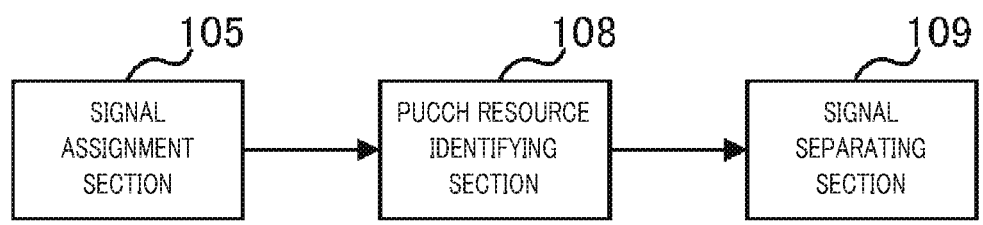
FIG. 4 is a block diagram illustrating a main configuration of a base station.

FIG. 4 is a block diagram illustrating a main configuration of base station 100 according to the embodiment of the present disclosure. In base station 100 illustrated in FIG. 4, signal assignment section 105 assigns a downlink control signal (MPDCCH) including PDSCH resource assignment information to a downlink resource (Narrowband). PUCCH resource identifying section 108 identifies the PUCCH resource to which an ACK/NACK for PDSCH is to be assigned, based on the downlink resource to which the downlink control signal has been assigned. Signal separating section 109 separates the ACK/NACK signal included in the identified PUCCH resource from a received signal from the terminal to which the downlink control signal has been transmitted.

Figure 5:
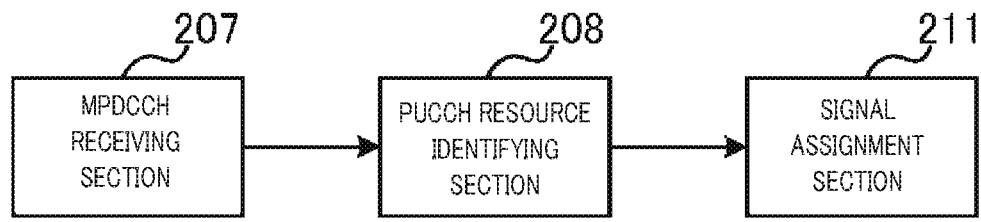
FIG. 5 is a block diagram illustrating a main configuration of a terminal.

Moreover. FIG. 5 is a block diagram illustrating a main configuration of terminal 200 according to each embodiment of the present disclosure. In terminal 200 illustrated in FIG. 5, MPDCCH receiving section 207 receives a downlink control signal (MPDCCH) including PDSCH resource assignment information. PUCCH resource identifying section 208 identifies the PUCCH resource to which an ACK/NACK signal for PDSCH is to be assigned, based on the downlink resource to which the downlink control signal has been assigned. Signal assignment section 211 assigns an ACK/NACK signal to the identified PUCCH resource.

In addition, the above-mentioned downlink resource (Narrowband) is composed of a plurality of PRB pairs, and any of the 1st PRB set and the 2nd PRB set is assigned to each of the plurality of PRB pairs. PUCCH resource identifying section 108 (208) identifies the PUCCH resource using the offset value configured for any of the 1st PRB set and the 2nd PRB set in a case where a down control signal is mapped over the 1st PRB set and the 2nd PRB set described above.

Embodiment 1

[Configuration of Base Station]

Figure 6:
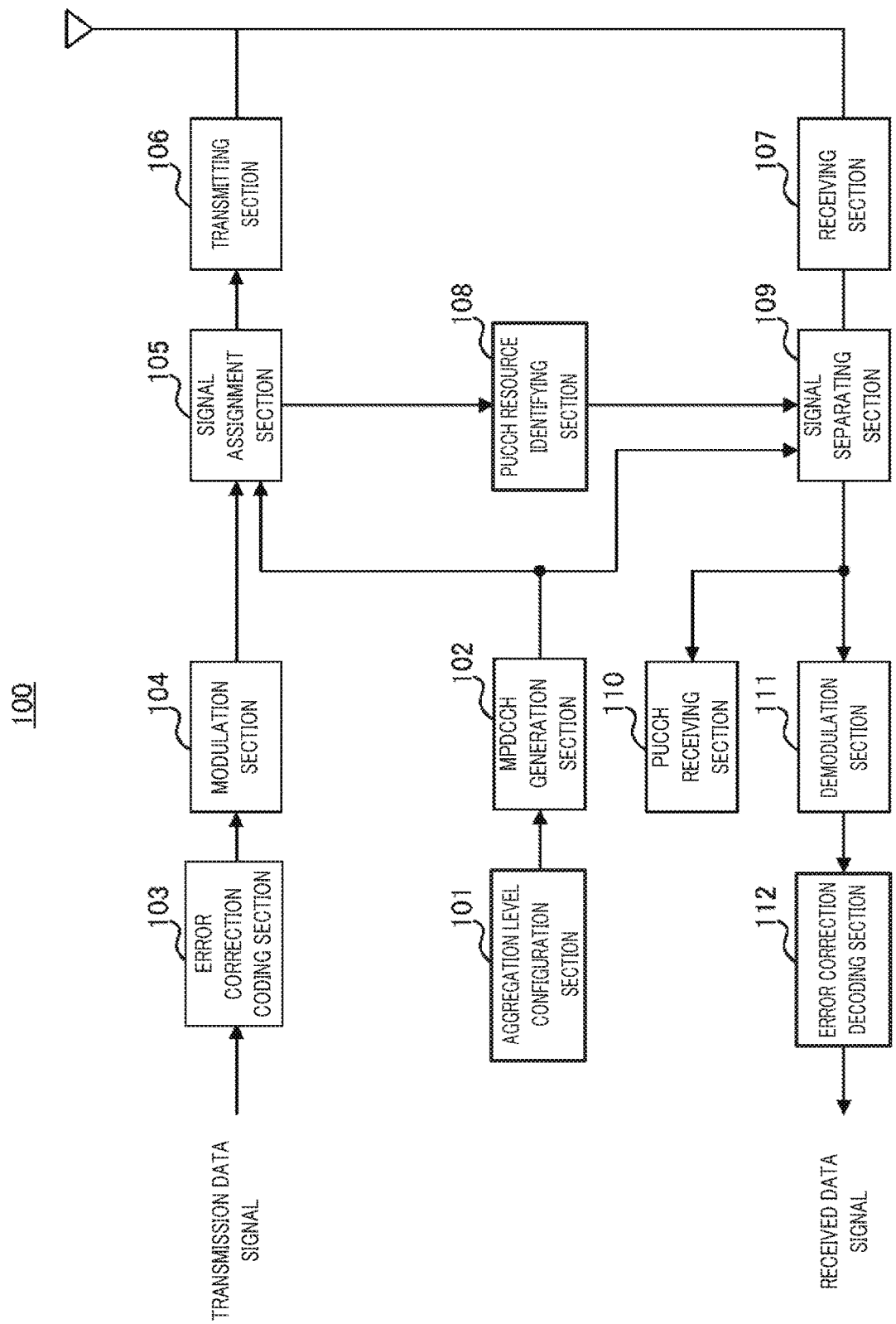
FIG. 6 is a block diagram illustrating a configuration of the base station.

FIG. 6 is a block diagram illustrating a configuration of base station 100 according to the present embodiment. In FIG. 6, base station 100 includes aggregation level configuration section 101, MPDCCH generation section 102, error correction coding section 103, modulation section 104, signal assignment section 105, transmitting section 106, receiving section 107, PUCCH resource identifying section 108, signal separating section 109, PUCCH receiving section 110, demodulation section 111, and error correction decoding section 112.

Aggregation level configuration section 101 configures an aggregation level for an MTC terminal based on receiving quality of the MTC terminal and the number of information bits of MPDCCH (not illustrated) which are held by base station 100. Aggregation level configuration section 101 outputs the configured aggregation level to MPDCCH generation section 102.

MPDCCH generation section 102 generates MPDCCH which is the control information directed to the MTC terminal. More specifically, MPDCCH generation section 102 generates the information bit of MPDCCH, applies error correction coding thereto, generates a transmission bit sequence by rate matching from the aggregation level inputted from aggregation level configuration section 101, and the number of REs available for MPDCCH, and outputs the transmission bit sequence to signal assignment section 105. MPDCCH includes DL assignment information indicating PDSCH resource allocation, and UL assignment information indicating PUSCH resource allocation, for example. Moreover, the DL assignment information is outputted to signal assignment section 105, and the UL assignment information is outputted to signal separating section 109.

Error correction coding section 103 applies error correction coding to a transmission data signal (DL data signal) or higher layer signaling and outputs the encoded signal to modulation section 104.

Modulation section 104 applies modulation processing to the signal received from error correction coding section 103 and outputs the modulated data signal to signal assignment section 105.

Signal assignment section 105 assigns the signal (including data signal) received from modulation section 104, and the control signal (MPDCCH) received from MPDCCH generation section 102 to a predetermined downlink resource. For example, when the aggregation level of MPDCCH is 1, 2, 4, or 8, signal assignment section 105 assigns MPDCCH to either PRB set 0 or PRB set 1 in Narrowband, and when the aggregation level of MPDCCH is 16, signal assignment section 105 assigns MPDCCH to a PRB set having the number of PRBs equal to 4. Furthermore, when the aggregation level is 24 (24 ECCEs), signal assignment section 105 assigns MPDCCH to all ECCEs in Narrowband over PRB set 0 and PRB set 1 in Narrowband. Moreover, signal assignment section 105 assigns a signal directed to an MTC terminal to Narrowband among a transmission data signal and higher layer signaling. In this manner, a transmission signal is formed by assigning a control signal (MPDCCH) and a data signal (PDSCH) to a predetermined resource. The transmission signal thus formed is outputted to transmitting section 106. Moreover, signal assignment section 105 outputs assignment information (e.g., the PRB set number, the minimum ECCE number, and ARO included in the DL assignment information to which MPDCCH has been mapped) indicating the resource to which MPDCCH is assigned, to PUCCH resource identifying section 108.

Transmitting section 106 applies radio transmission processing, such as up-conversion, to the transmission signal inputted from signal assignment section 105, and transmits the processed signal to terminal 200 via an antenna.

Receiving section 107 receives, via an antenna, the signal transmitted from terminal 200, and applies radio reception processing, such as down-conversion, to the received signal, and outputs the processed signal to signal separating section 109.

PUCCH resource identifying section 108 identifies a PUCCH resource to which an ACK/NACK signal for the data signal (PDSCH) indicated by the MPDCCH is assigned, based on the downlink resource which is indicated by the assignment information inputted from signal assignment section 105 and to which the MPDCCH is assigned. PUCCH resource identifying section 108 outputs the information indicating the identified PUCCH resource to signal separating section 109. In addition, the PUCCH resource identifying method in PUCCH resource identifying section 108 will be described in detail, hereinafter.

Signal separating section 109 separates a UL data signal from the received signal based on the information inputted from MPDCCH generation section 102 and outputs the separated signal to demodulation section 111. Moreover, signal separating section 109 separates the signal (including ACK/NACK signal) included in the PUCCH resource from the received signal based on the information inputted from PUCCH resource identifying section 108 and outputs the signal to PUCCH receiving section 110.

PUCCH receiving section 110 determines an ACK and NACK from the signal (PUCCH) inputted from signal separating section 109 and indicates the determination result to a higher layer.

Demodulation section 111 applies demodulation processing to the signal inputted from signal separating section 109 and outputs the signal acquired by the demodulation processing to error correction decoding section 112.

Error correction decoding section 112 decodes the signal inputted from demodulation section 111 and acquires a received data signal from terminal 200.

[Configuration of Terminal]

Figure 7:
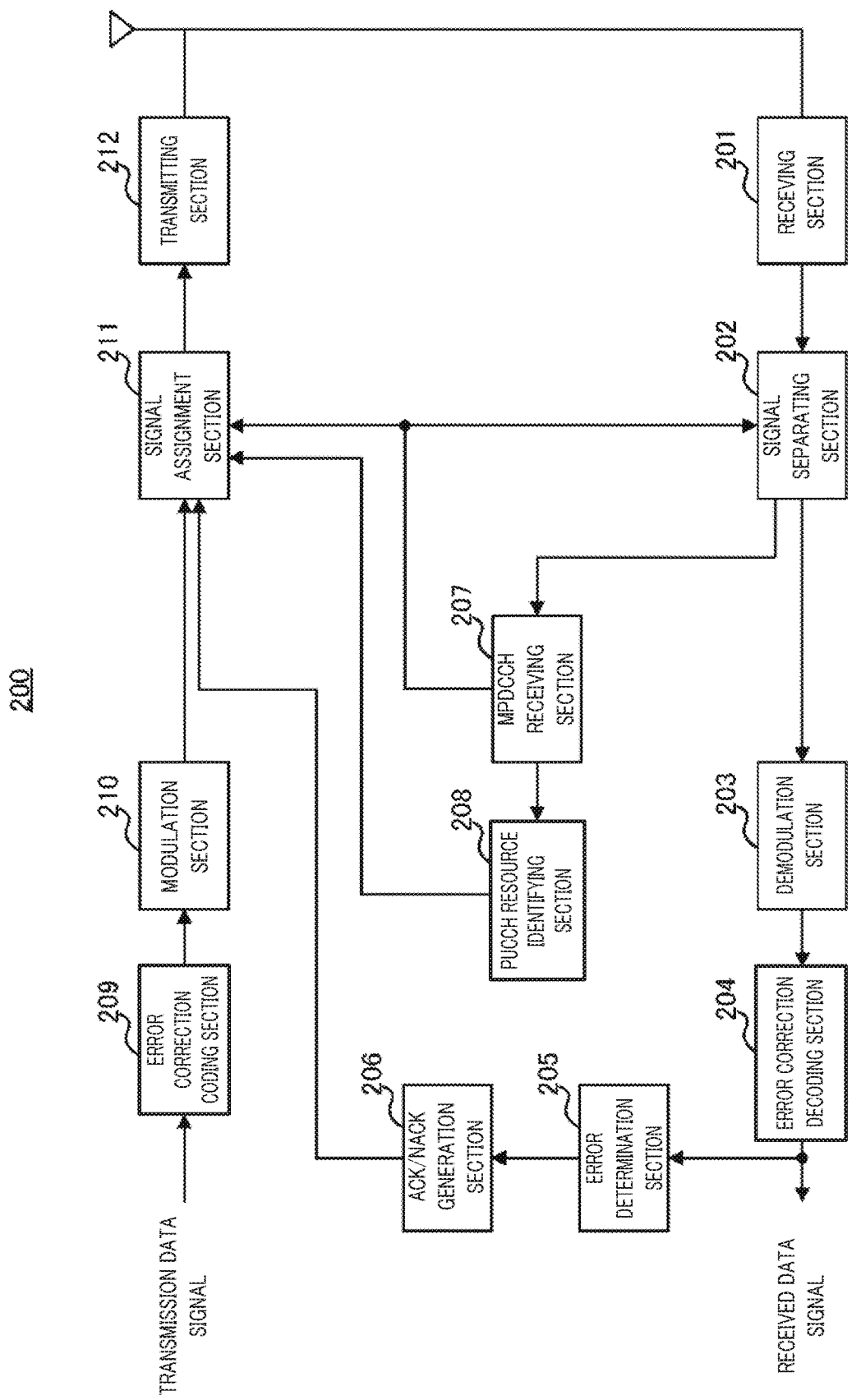
FIG. 7 is a block diagram illustrating a configuration of the terminal.

FIG. 7 is a block diagram illustrating a configuration of terminal 200 according to the present embodiment. In FIG. 7, terminal 200 includes receiving section 201, signal separating section 202, demodulation section 203, error correction decoding section 204, error determination section 205, ACK/NACK generation section 206, MPDCCH receiving section 207, PUCCH resource identifying section 208, error correction coding section 209, modulation section 210, signal assignment section 211, and transmitting section 212.

Receiving section 201 identifies to which Narrowband within a system band the signal has been assigned, based on a predetermined pattern, or information (not illustrated) indicated by a higher layer, and applies retuning to the identified Narrowband. Receiving section 201 then receives a received signal via an antenna, applies reception processing, such as down-conversion, to the received signal, and then outputs the processed signal to signal separating section 202.

Signal separating section 202 outputs, to MPDCCH receiving section 207, the signal (MPDCCH signal) mapped to a PRB to which MPDCCH may have been assigned. Moreover, signal separating section 202 separates a DL data signal and higher layer signaling from the received signal based on the DL assignment information inputted from MPDCCH receiving section 207, and outputs the DL data signal and higher layer signaling to demodulation section 203.

Demodulation section 203 demodulates the signal received from signal separating section 202 and outputs the demodulated signal to error correction decoding section 204.

Error correction decoding section 204 decodes the demodulated signal received from demodulation section 203 and outputs the received data signal acquired by decoding. Moreover, the received data signal is outputted to error determination section 205.

Error determination section 205 detects an error by CRC of the received data signal and outputs the detection result to ACK/NACK generation section 206.

ACK/NACK generation section 206 generates an ACK when there is no error, and generates a NACK when there is an error, based on the detection result of the received data signal inputted from error determination section 205, and outputs the generated ACK/NACK signal to a higher layer and signal assignment section 211.

MPDCCH receiving section 207 detects MPDCCH which is a control signal including DL assignment information or UL assignment information by attempting reception of the MPDCCH signal received from signal separating section 202 with respect to search space for each PRB set 0 and PRB set 1, and "24 ECCEs" assigned to all ECCEs in Narrowband over PRB set 0 and PRB set 1. MPDCCH receiving section 207 outputs the DL assignment information detected as a signal directed to terminal 200 of MPDCCH receiving section 207, to signal separating section 202, and outputs the UL assignment information to signal assignment section 211. Moreover, MPDCCH receiving section 207 outputs the assignment information indicating the PRB set number, the minimum ECCE number, and ARO included in DL the assignment information, to which the MPDCCH has been mapped, to PUCCH resource identifying section 208.

PUCCH resource identifying section 208 identifies the PUCCH resource to which an ACK/NACK for the received data signal is assigned, based on the assignment information inputted from MPDCCH receiving section 207 (PRB set number, the minimum ECCE number, and ARO), and the N_pucch information that is previously indicated by a higher layer. PUCCH resource identifying section 208 outputs the information indicating the identified PUCCH resource to signal assignment section 211. No that, the PUCCH resource identifying method in PUCCH resource identifying section 208 will be described in detail, hereinafter.

Error correction coding section 209 applies error correction coding to the transmission data signal (UL data signal) and outputs the encoded data signal to modulation section 210.

Modulation section 210 modulates the data signal received from error correction coding section 209 and outputs the modulated data signal to signal assignment section 211.

Signal assignment section 211 assigns the data signal inputted from modulation section 210 to a resource based on the UL assignment information received from MPDCCH receiving section 207 and outputs the resultant to transmitting section 212. Moreover, signal assignment section 211 assigns the ACK/NACK signal inputted from ACK/NACK generating section 206 to a PUCCH resource based on the PUCCH resource allocation information inputted from PUCCH resource identifying section 208, and outputs the resultant to transmitting section 212.

Transmitting section 212 identifies the resource corresponding to Narrowband to which UL data is assigned, based on the predetermined pattern and applies retuning. Transmitting section 212 applies transmission processing, such as up-conversion, to the signal inputted from signal assignment section 211, and transmits the processed signal via an antenna.

[Operations of Base station 100 and Terminal 200]

The operations of base station 100 and terminal 200 each configured in the manner described above will be described in detail.

In the present embodiment, in a case where MPDCCH is mapped over a plurality of PRB sets (4 PRB set and 2 PRB set) (i.e., case of MPDCCH of 24 CCEs), base station 100 (PUCCH resource identifying section 108) and terminal 200 (PUCCH resource identifying section 208) identify a PUCCH resource, using an offset value (N_pucch) configured for any of the plurality of PRB sets.

Hereinafter, Operation Examples 1 and 2 according to the present embodiment will be described.

(Operation Example 1)

In Operation Example 1, when detecting MPDCCH of 24 ECCEs, terminal 200 (MTC terminal) identifies a PUCCH resource, using an offset value (MTC N_pucch) configured for a PRB set assigned to a PRB pair having a minimum PRB number among the PRB sets in Narrowband in both Options 1 and 2.

For example, in FIG. 2A of Option 1, and FIG. 3A of Option 2, terminal 200 identifies a PUCCH resource, using N_pucch corresponding to the 2 PRB set assigned to PRB pair #0. Meanwhile, in FIG. 2B of Option 1, and FIG. 3B of Option 2, terminal 200 identifies a PUCCH resource, using N_pucch corresponding to 4 PRB set assigned to PRB #0.

Moreover, base station 100 identifies, as in the case of terminal 200, a PUCCH resource to which an ACK/NACK signal is assigned, using an offset value (MTC N_pucch) configured for a PRB set assigned to a PRB pair having a minimum PRB number among the PRB sets in Narrowband to which MPDCCH is assigned.

In a case where the PUCCH resource corresponding to MPDCCH of 24 ECCEs is identified in the manner described above, the offset value N_pucch to be configured for MPDCCH of 24 ECCEs differs in accordance with assignment of a PRB set of MPDCCH to a PRB pair, as described above. Accordingly, the PUCCH resource corresponding to MPDCCH of 24 ECCEs can be switched by assignment of a PRB set of MPDCCH.

Figure 8:
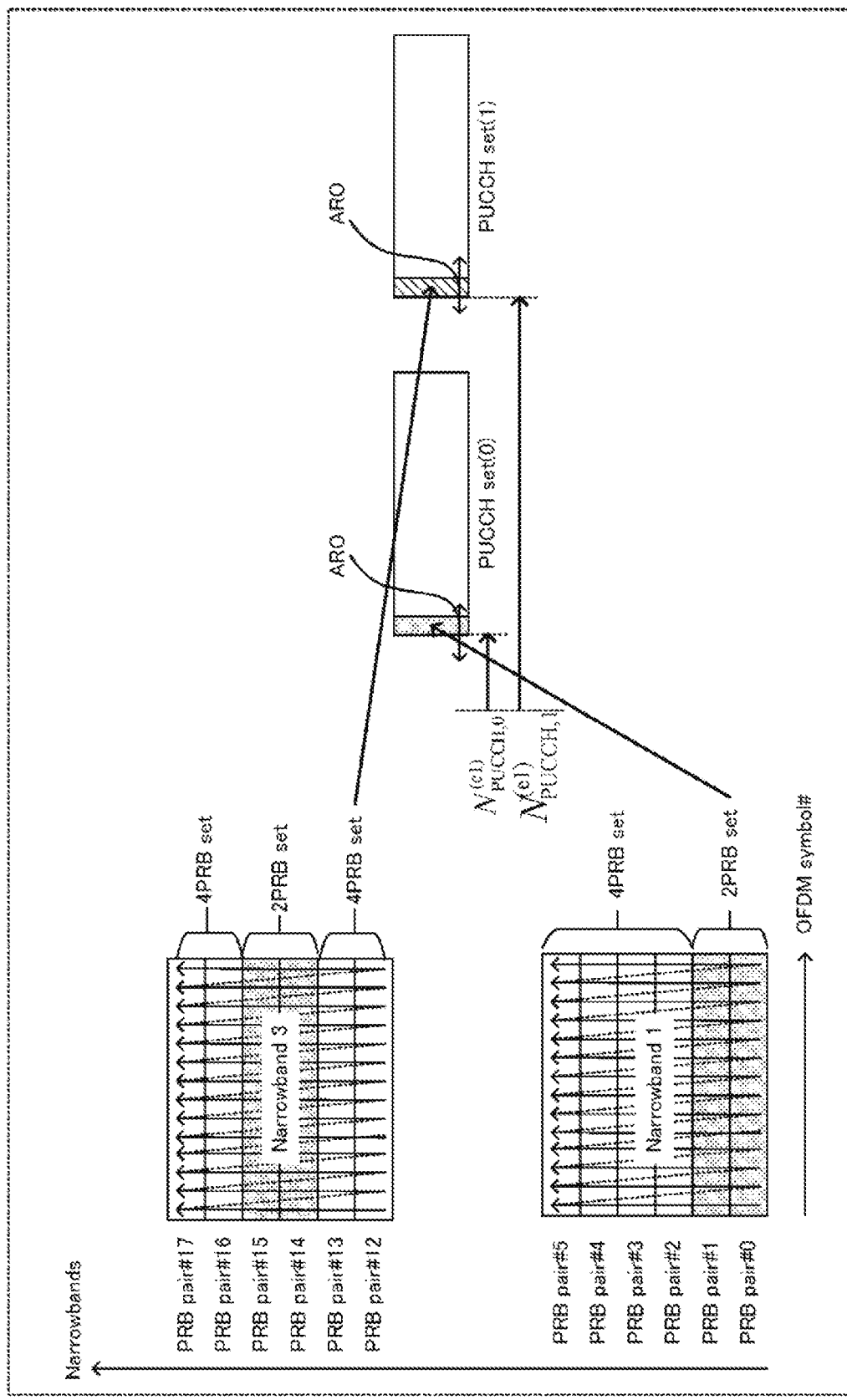
FIG. 8 is a diagram illustrating an example of a PUCCH resource identification method according to Operation Example 1 of Embodiment 1.

FIG. 8 illustrates a PUCCH resource allocation example of a case where two Narrowbands 1 and 3 are used for different MTC terminals (terminals 200), and MPDCCH of 24 ECCEs is detected in both Narrowbands.

In FIG. 8, N_pucch, 0 is configured for 2 PRB set, and N_pucch, 1 is configured for 4PRB set. Moreover, assignment of PRB set differs between two Narrowbands illustrated in FIG. 8. More specifically, in Narrowband 1, as in FIG. 2A, 2 PRB set is assigned to PRB pairs #0 and #1, and 4 PRB set is assigned to PRB pairs #2 to #5. Meanwhile, in Narrowband 3, as in FIG. 2B, 2 PRB set is assigned to PRB pairs #14 and #15, and 4PRB set is assigned to PRB pairs #12, #13, #16, and #17.

In this case, the MTC terminal that uses Narrowband 1 identifies a PUCCH resource, using N_pucch, 0 configured for 2 PRB set assigned to PRB pair #0 having the minimum PRB number. Meanwhile, the MTC terminal that uses Narrowband 3 identifies a PUCCH resource, using N_pucch, 1 configured for 4 PRB set assigned to PRB pair #12 having the minimum PRB number.

Accordingly, as illustrated in FIG. 8, even when MPDCCH of 24 ECCEs has been simultaneously mapped in two Narrowbands 1 and 3, each of the MTC terminals identifies a PUCCH resource, using different N_pucch, so that a collision of PUCCH resources can be prevented.

Operation Example 2

In Operation Example 2, when detecting MPDCCH of 24 ECCEs in both Options 1 and 2, terminal 200 (MTC terminal) identifies a PUCCH resource, using an offset value (N_pucch, 0) configured for a PRB set having the minimum PRB set number among the PRB sets in Narrowband.

N_pucch, 0 is N_pucch configured for PRB set 0 (first PRB set), herein. Which PRB set is PRB set 0 or PRB set 1 among 2 PRB set and 4 PRB set may be indicated during configuration performed in a higher layer (RRC signaling), or one of the PRB sets may be previously defined to be PRB set 0. Moreover, N_pucch, 0 and N_pucch, 1 are indicated to terminal 200 by the higher layer (RRC signaling). The higher layer signaling may be an SIB for MTC which can be received in common by MTC terminals or signaling specific to terminal 200.

Moreover, as in the case of terminal 200, base station 100 identifies a PUCCH resource to which an ACK/NACK signal is assigned, using an offset value (N_pucch, 0) configured for a PRB set having the minimum PRB set number among PRB sets in Narrowband to which MPDCCH is assigned.

Thus, when the PUCCH resource corresponding to MPDCCH of 24 ECCEs is to be identified in the manner described above, N_pucch, 0 is always used independently of which PRB pair each PRB set is assigned to in Narrowband.

Moreover, when 24 ECCEs are used without assumption of MU-MIMO, another MPDCCH is not mapped in Narrowband in which 24 ECCEs are mapped. Therefore, in order to avoid generating an unnecessary blank resource, it is desirable to use a PUCCH resource having a low resource number. In this respect, using N_pucch, 0 in a case where a PUCCH resource corresponding to MPDCCH of 24 ECCEs is to be identified, it can be expected that a PUCCH resource having a low resource number is configured. Thus, reduction of PUCCH resources can be achieved, and a PUSCH resource can be secured more widely. Note that, it is assumed herein that the value of N_pucch, 0 is smaller than the value of N_pucch, 1.

Moreover, when MPDCCH is transmitted in another Narrowband and the same N_pucch, 0 and $n_{ECCE, 0}$=0 are used under assumption of MU-MIMO, a collision of PUCCH resources occurs. However, the collision of PUCCH resources can be avoided by ARO in this case.

Variation of Operation Example 2

Note that, in Operation Example 2, it is possible to set a rule that, when an MTC terminal detects MPDCCH of 24 ECCEs, a PUCCH resource is identified using N_pucch, 1. In this case, configuring N_pucch, 1 to have a value smaller than N_pucch, 0 makes it possible to achieve reduction of PUCCH resources.

Moreover, it is possible to set a rule that, when an MTC terminal detects MPDCCH of 24 ECCEs, a PUCCH resource is identified using one of N_pucch, 0 and N_pucch, 1 whichever has a smaller value than the other. In this case, reduction of PUCCH resources can be achieved irrespective of the magnitude relationship of N_pucch, 0 and N_pucch, 1.

Moreover, it is possible to set a rule that, when an MTC terminal detects MPDCCH of 24 ECCEs, a PUCCH resource is identified using N_pucch corresponding to 4 PRB set or N_pucch corresponding to 2 PRB set. In this case, configuring N_pucch corresponding to 4 PRB set or N_pucch corresponding to 2 PRB set to have a small value makes it possible to achieve reduction of PUCCH resources.

Operation Examples 1 and 2 according to the present embodiment have been described thus far.

As described above, in the present embodiment, in a case where MPDCCH is mapped over a plurality of PRB sets, base station 100 and terminal 200 identify a PUCCH resource, using N_pucch, q corresponding to any of the plurality of PRB sets q to which the MPDCCH is mapped.

In the manner described above, base station 100 and terminal 200 can identify the PUCCH resource corresponding to MPDCCH mapped over a plurality of PRB sets, as with 24 ECCEs, without addition of new signaling. That is, according to the present embodiment, the PUCCH resource of the case where one MPDCCH is mapped to all 6 PRB pairs in Narrowband can be efficiently identified.

In addition, in MPDCCH mapping of Option 2, in the operation example described above, a description has been given with an example of a case where an assumption is made that, PRB set 0 (first PRB set) indicated by a higher layer is 4 PRB set while PRB set 1 (second PRB set) is 2 PRB set, and MPDCCH is mapped to 4 PRB set first. It is, however, MPDCCH may be mapped to PRB set 1 (second PRB set) first.

Embodiment 2

A base station and a terminal according to Embodiment 2 have basic configurations common to base station 100 and terminal 200 according to Embodiment 1, so that a description will be given while FIGS. 6 and 7 are incorporated herein.

In Embodiment 1, a description has been given of the case where an assumption is made that different offset values N_pucch are configured for a plurality of PRB sets. Meanwhile, in this embodiment, a description will be given of a case where an assumption is made that a common offset value N_pucch is configured for a plurality of PRB sets.

The PUCCH resource corresponding to MPDCCH in this embodiment will be described, hereinafter.

For PUCCH of MTC terminals of the same repetition level, common $N_{PUCCH}^{(e1)}$ (hereinafter, simply referred to as "N_pucch") is configured for PRB sets, and a PUCCH resource is identified from an ECCE number for each PRB set. The PUCCH resource (resource number) for transmitting PUCCH format 1a/1b is identified by the following expressions.

$$\text{distributed assignment } n_{PUCCH}^{(1,\tilde{p}_0)} = \qquad\qquad\qquad \text{[Expression 2]}$$
$$n_{ECCE,q} + \Delta_{ARO} + N_{PUCCH}^{(e1)} + K_q$$
$$\text{localized assignment } n_{PUCCH}^{(1,\tilde{p}_0)} =$$
$$\left\lfloor \frac{n_{ECCE,q}}{N_{RB}^{ECCE,q}} \right\rfloor \cdot N_{RB}^{ECCE,q} + n' + \Delta_{ARO} + N_{PUCCH}^{(e1)} + K_q$$

In the case of PRB set 0 (q=0), $K_0$=0, and in the case of PRB set 1 (q=1), $K_1$ represents the number of ECCEs included in PRB set 0. For example, when PRB set 0 is 4 PRB set (16 ECCEs), $K_1$=16, and when PRB set 1 is 2 PRB set (8 ECCEs), $K_1$=8.

Figure 9:
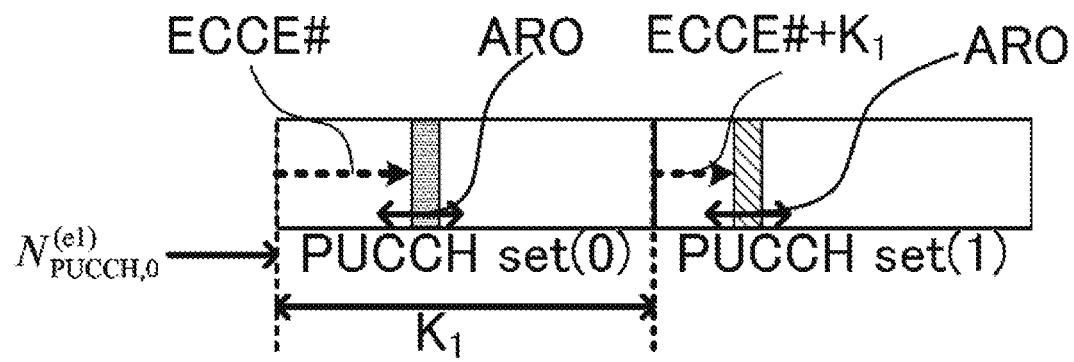
FIG. 9 is a conceptual diagram of a PUCCH resource.

FIG. 9 illustrates a conceptual diagram of a PUCCH resource of the present embodiment.

As illustrated in FIG. 9, the PUCCH resource (PUCCH set (0)) corresponding to PRB set 0 is identified using N_pucch and an ECCE number, and the PUCCH resource (PUCCH set (1)) corresponding to PRB set 1 is identified using N_pucch+ECCE number+$K_1$ (provided that, $K_1$ is the number of ECCEs in PUCCH set (0)). Thus, the PUCCH resource corresponding to PRB set 0 and the PUCCH resource corresponding to PRB set 1 are configured to be contiguous resources. Therefore, when all MPDCCHs are transmitted using aggregation level 1, the PUCCH resource for PRB set 1 can be mapped after the PUCCH resource corresponding to PRB set 0 is secured, without using ARO.

In the present embodiment, base station 100 and terminal 200 identify a PUCCH resource corresponding to MPDCCH (MPDCCH of 24 ECCEs) mapped over a plurality of PRB sets, using common N_pucch.

Hereinafter, Operation Example 3 according to the present embodiment will be described.

Operation Example 3

In Operation Example 3, when detecting MPDCCH of 24 ECCEs, base station 100 and terminal 200 (MTC terminal) identify a PUCCH resource, using N_pucch configured in common to a plurality of PRB sets in Narrowband in both Options 1 and 2. At this time, Kq=0 irrespective of which PRB pairs 4 PRB set and 2 PRB set are assigned to. Moreover, in a case where an assumption is made that the minimum ECCE number of a case of using MPDCCH of 24 ECCEs is $n_{ECCE,q}=0$, a PUCCH resource (resource number) is identified by the following expressions.

distributed assignment: $n_{PUCCH}^{(1,\tilde{p}0)}=\Delta_{ARO}+N_{PUCCH}^{(e1)}$ localized assignment: $n_{PUCCH}^{(1,\tilde{p}0)}=n'+\Delta_{ARO}+N_{PUCCH}^{(e1)}$ [Expression 3]

As described above, when base station 100 and terminal 200 identify the PUCCH resource corresponding to MPDCCH of 24 ECCEs based on common N_pucch, a PUCCH resource having a low resource number can be always configured as the PUCCH resource corresponding to MPDCCH of 24 ECCEs irrespective of assignment of an MPDCCH PRB set to a PRB pair.

Thus, it is made possible to avoid a situation where an unnecessary blank PUCCH resource is secured and to achieve reduction of PUCCH resources, and as a result of this, the PUSCH resource can be secured more widely.

Moreover, according to the present embodiment, base station 100 and terminal 200 can identify the PUCCH resource corresponding to MPDCCH mapped over a plurality of PRB sets as with 24 ECCEs without addition of new signaling as in Embodiment 1. That is, according to the present embodiment, the PUCCH resource of the case where one MPDCCH is mapped to all 6 PRB pairs in Narrowband can be efficiently identified.

Note that, in a case where MPDCCH is transmitted and the same N_pucch, 0 and $n_{ECCE, 0}=0$ are used in another Narrowband under assumption of MU-MIMO, as in Operation Example 2 of the Embodiment 1, a collision of PUCCH resources occurs. In this case, however, the collision of PUCCH resources can be avoided by ARO.

Moreover, although the case where the PUCCH resource corresponding to a PRB set is changed for each PRB set q using variable $K_q$ has been described in the present embodiment, the PUCCH resource may be shared between PRB sets q without using $K_q$. In this case, the collision of PUCCH resources between PRB sets q may be avoided by ARO. In particular, it is predicted that PUCCH resources are not crowded in a case where MPDCCH with a high aggregation level is used as in MPDCCH of 24 ECCEs, so that the collision can be avoided by only ARQ. As described above, by sharing PUCCH resource between PRB sets q, the amount of PUCCH resource can be reduced. Moreover, in this case as well, the PUCCH resource of a case where MPDCCH of 24 ECCEs is detected can be found by an expression similar to that of Operation Example 3.

Moreover, although a description has been given with the case where $K_1$ is set to be the number of ECCEs included in PRB set 0 in the present embodiment, the value of $K_1$ is not limited to this and may be a value indicating ½ of the number of ECCEs included in PRB set 0, for example. When $K_1$ is set to a small value such as ½ of the number of ECCEs, the entirety of the amount of PUCCH resources can be reduced. This is effective, for example, when the probability of a collision of PUCCH resources is low.

Embodiment 3

When MPDCCH of 24 ECCEs is mapped to an MPDCCH PRB set first in Narrowband as described in Option 2, there may be a case where an MTC terminal erroneously recognizes reception as having received a maximum aggregation signal of an MPDCCH PRB set to which MPDCCH has been mapped first (hereinafter, referred to as "erroneous recognition 1") and a case where an MTC terminal erroneously recognizes reception as having received a maximum aggregation level signal of an MPDCCH PRB set to which MPDCCH has been mapped second (hereinafter, referred to as "erroneous recognition 2").

Hereinafter, for simplicity of description, an assumption is made that 24 ECCEs are mapped to PRB set 0, first. Hereinafter, the erroneous recognition described above and possible problems associated therewith will be described using FIGS. 10 and 11.

Erroneous recognition 1 may occur when the number of transmittable bits which is calculated from the number of REs available for MPDCCH in PRB set 0 becomes an integral multiple of the number of after encoding bits of MPDCCH. Moreover, erroneous recognition 2 may occur, in addition to the above condition of erroneous recognition 1, when the number of transmittable bits which is calculated from the number of REs available for MPDCCH in PRB set 1 becomes an integral multiple of the number of after encoding bits of MPDCCH.

Figure 10:
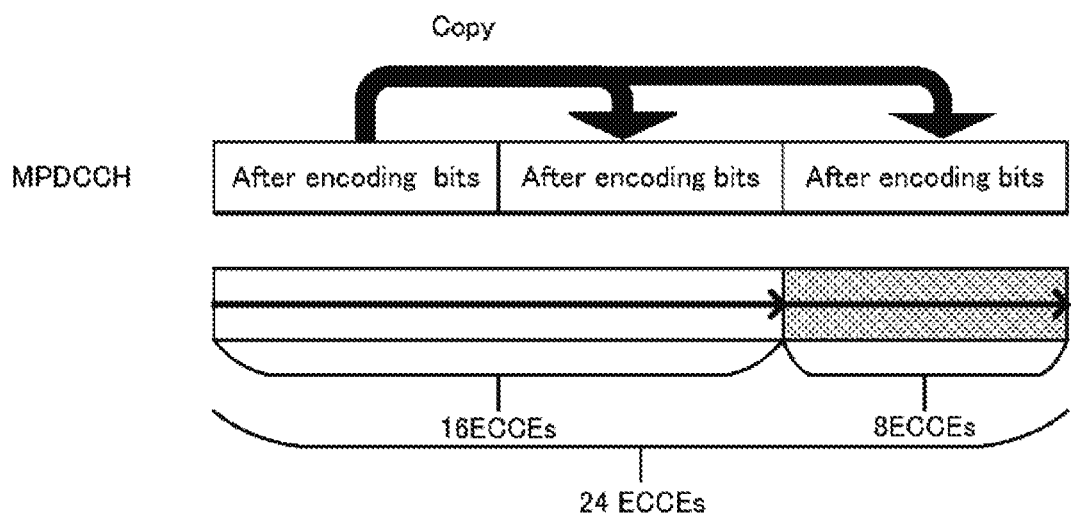
FIG. 10 is a diagram provided for describing a problem of Embodiment 3.

FIG. 10 illustrates a case where the number of after encoding bits of MPDCCH is equal to the number of transmittable bits in aggregation level 8 (8 ECCEs). Accordingly, the transmission bit sequence of 24 ECCEs is generated, by rate matching, as a bit sequence which is three times the bit sequence by copying the after encoding bits. As illustrated in FIG. 10, the generated transmission bit sequence is mapped to 16 ECCEs of 4 PRB set, which is PRB set 0, and then, is mapped to 8 ECCEs of 2 PRB set, which is PRB set 1.

When the number of after encoding bits of MPDCCH is equal to the number of transmittable bits in another aggregation level, it is not necessary to reduce the bits at the time of rate matching. For this reason, the transmission bit sequence of the first-half 16 ECCEs and the second-half 8 ECCEs of the transmission bit sequence of 24 ECCEs illustrated in FIG. 10 becomes a bit sequence receivable as 16 ECCEs or 8 ECCEs (i.e., bit sequence is one that is erroneously recognized as 16 ECCEs or 8 ECCEs) in an MTC terminal when the reception quality in the MTC terminal is high.

Note that, whether bits are reduced or not at the time of rate matching differs depending on the number of REs available for MPDCCH transmission. Moreover, the number of REs available for MPDCCH transmission is variable depending on the PDCCH length, the number of CRS ports, the number of CSI-RS ports, and/or CP length, for example. Therefore, it is difficult to cover all patterns as to under what conditions the problems of erroneous recognition occur for MPDCCH. Meanwhile, in PDCCH, when a similar problem occurs, the measure to add a padding bit to information bits is taken. This is because the number of REs used for transmission of each aggregation level is fixed. Moreover, in EPDCCH, this problem is avoided by mapping of EPDCCH to REs is configured to be Frequency first.

Moreover, the erroneous recognition occurs when the actual reception quality of an MTC terminal is greater than the reception quality of the MTC terminal which has been predicted by the base station, and MPDCCH can be received in the MTC terminal with aggregation level 16 of 4 PRB set or aggregation level 8 of 2 PRB set, each of which is an aggregation level lower than 24 ECCEs. When erroneous recognition of this aggregation level occurs, there arises a problem in that a PUCCH resource is erroneously selected.

More specifically, in a case where an MTC terminal erroneously recognizes reception as having received MPDCCH of aggregation level 16 of 4 PRB set or MPDCCH of aggregation level 8 of 2 PRB set although the base station has transmitted the MPDCCH using 24 ECCEs, the MTC terminal transmits an ACK/NACK, using a PUCCH resource to be identified from N_pucch corresponding to aggregation level 16 of 4 PRB set or aggregation level 8 of 2 PRB set.

Figure 11:
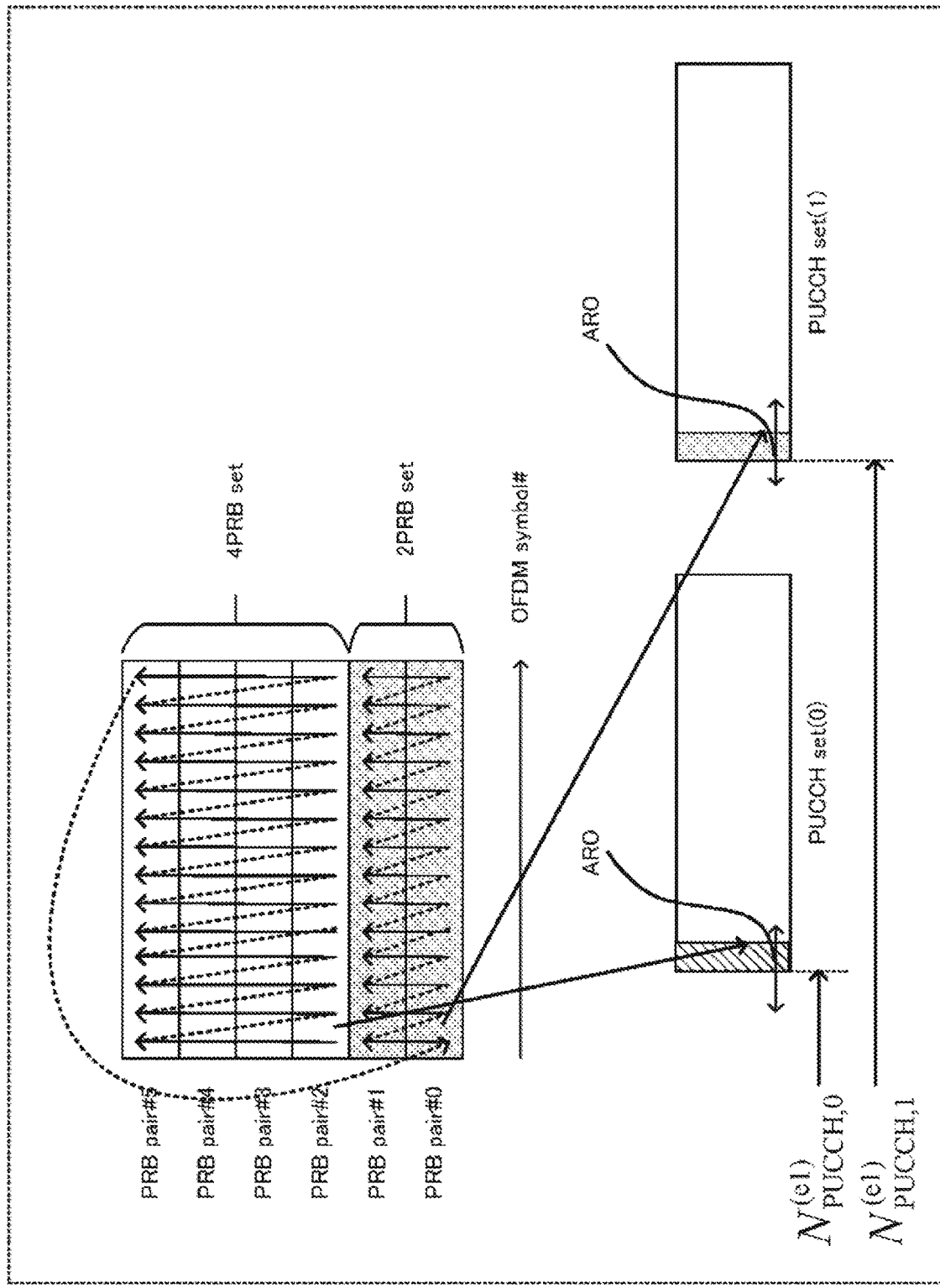
FIG. 11 is another diagram provided for describing the problem of Embodiment 3.

For example, in FIG. 11, when recognizing that the MTC terminal has received MPDCCH of aggregation level 16 of 4 PRB set, the MTC terminal transmits an ACK/NACK using a PUCCH resource (PUCCH set (0)) to be identified using N_pucch, 0 configured for 4 PRB set, and when recognizing that the MTC terminal has received MPDCCH of aggregation level 8 of 2 PRB set, the MTC terminal transmits an ACK/NACK using a PUCCH resource (PUCCH set (1)) to be identified using N_pucch, 1 configured for 2 PRB set.

More specifically, in FIG. 11, there is a possibility that the MTC terminal cannot transmit an ACK/NACK, using the PUCCH resource corresponding to 24 ECCEs, which has been originally planned by the base station. Meanwhile, there is a possibility that the base station attempts to receive an ACK/NACK, using the originally planned PUCCH resource corresponding to 24 ECCEs, and erroneously recognizes an ACK/NACK. Moreover, there is a possibility that transmission of an ACK/NACK, using a not planned PUCCH resource from the MTC terminal provides interference to a signal transmitted by another terminal.

Note that, in Option 1 (Frequency first), MPDCCH of 24 ECCEs is mapped over 4 PRB set and 2 PRB set in units of OFDM symbols, and since mapping of MPDCCH to the REs differs from MPDCCH of aggregation level 16 of 4 PRB set or MPDCCH of aggregation level 8 of 2 PRB set, the problems relating to the above-mentioned erroneous recognition do not occur.

In the present embodiment, a PUCCH resource identifying method capable of avoiding the erroneous recognition will be described.

A base station and a terminal according to Embodiment 3 have basic configurations common to base station 100 and terminal 200 according to Embodiment 1, so that a description will be given while FIGS. 6 and 7 are incorporated herein.

Hereinafter, Operation Examples 4 to 6 according to the present embodiment will be described.

Operation Example 4

In Operation Example 4, when detecting MPDCCH of 24 ECCEs, terminal 200 (MTC terminal) identifies a PUCCH resource, using N_pucch, q configured for PRB set q to which MPDCCH of 24 ECCEs is mapped first among a plurality of PRB sets in Narrowband. For example, when MPDCCH of 24 ECCEs is mapped to PRB set 0, first and then is mapped to PRB set 1, terminal 200, when detecting 24 ECCEs of MPDCCH, identifies a PUCCH resource using N_pucch, 0 configured for PRB set 0.

Accordingly, even in a case where terminal 200 erroneously recognizes the MPDCCH transmitted from base station 100, using 24 ECCEs, as MPDCCH of the maximum aggregation level of PRB set 0, terminal 200 can transmit an ACK/NACK using the PUCCH resource secured for MPDCCH of 24 ECCEs. Therefore, it is possible for terminal 200 to avoid erroneously selecting a PUCCH resource when erroneous recognition 1 occurs.

Furthermore, the number of PRB pairs to which PRB set 0 in which MPDCCH is mapped first is assigned may be greater than the number of PRB pairs to which PRB set 1 in which MPDCCH is mapped later is assigned. For example, PRB set 0 is set to 4 PRB set, and PRB set 1 may be set to 2 PRB set. In this manner, the probability of occurrence of erroneous recognition 2 can be lowered. This is because in order for an MTC terminal to receive MPDCCH of 24 ECCEs as aggregation level 8, even higher reception quality than that of reception as aggregation level 16 is required, so that the probability of occurrence of erroneous recognition of 24 ECCEs as aggregation level 8 is lower than the probability of occurrence of erroneous recognition of 24 ECCEs as aggregation level 16. Thus, when PRB set 0 is set to 4 PRB set, and PRB set 1 is set to 2 PRB set, the probability of occurrence of erroneous recognition 2 can be lowered while erroneous selection of a PUCCH resource caused by erroneous recognition 1 is avoided, by identifying a PUCCH resource using N_pucch,0 configured for PRB set 0, when terminal 200 detects MPDCCH of 24 ECCEs.

Moreover, according to the present embodiment, base station 100 and terminal 200 identify a PUCCH resource, using offset value N_pucch configured for a PRB set to which MPDCCH is mapped, first. Thus, as in Embodiment 1, base station 100 and terminal 200 can identify, without addition of new signaling, the PUCCH resource corresponding to MPDCCH mapped over a plurality of PRB sets as with 24 ECCEs. That is, the PUCCH resource of the case where one MPDCCH is mapped to all 6 PRB pairs in Narrowband can be efficiently identified.

Operation Example 5

In Operation Example 5, in order to avoid erroneous selection of a PUCCH resource caused by erroneous recognition 2, when detecting MPDCCH as the maximum aggregation level of a PRB set, terminal 200 (MTC terminal) identifies a PUCCH resource, using N_pucch, 0, in addition to the operations in Operation Example 4.

For example, when detecting MPDCCH with the maximum aggregation level of PRB set 1, terminal 200 identifies the PUCCH resource, using N_pucch,0, and when detecting MPDCCH with another aggregation level of PRB set 1, terminal 200 identifies the PUCCH resource, using N_pucch, configured for PRB set 1, With this configuration, terminal 200 identifies a PUCCH resource, using N_pucch, 0 for all three cases where MPDCCH is detected with 24 ECCEs, where MPDCCH is detected with the maximum aggregation level of PRB set 0, and where MPDCCH is detected with the maximum aggregation level of PRB set 1.

Therefore, even when terminal 200 erroneously detects the aggregation level of received MPDCCH, the PUCCH resource to be used for transmission of an ACK/NACK signal becomes the same resource as the resource of a case where no erroneous detection occurs. Thus, erroneous selection of a PUCCH resource caused by erroneous recognition 1 and erroneous recognition 2 can be avoided.

Note that, when base station 100 transmits MPDCCH directed to a certain MTC terminal with the maximum aggregation level of PRB set 1, and also transmits MPDCCH directed to another MTC terminal with ECCE #0 of PRB set 0, there arises a problem in that PUCCH resources corresponding to the MPDCCHs collide with each other. This collision, however, can be avoided by ARO.

Moreover, in PRB set 1, only when an MTC terminal detects MPDCCH with the maximum aggregation level, N_pucch, 0 is used, and when an MTC terminal detects MPDCCH with another aggregation level, N_pucch, 1 is used. Accordingly, with an aggregation level other than the maximum aggregation level of PRB set 1, even when base station 100 transmits MPDCCH including ECCE #0, the probability of collision with a PUCCH resource of PRB set 0 does not change as compared with a case where Operation Example 5 is not applied.

Operation Example 6

In Operation Example 6, in order to avoid erroneous recognition 2, when mapping MPDCCH of 24 ECCEs, base station 100 differs the mapping order to REs from mapping to REs with the maximum aggregation level of PRB set 1. Changing the mapping order to the REs of MPDCCH makes it possible to avoid the occurrence of erroneous detection as the maximum aggregation level of PRB set 1 in terminal 200 (MTC terminal) when MPDCCH of 24 ECCEs is transmitted.

Hereinafter, a specific example of an MPDCCH mapping method to REs will be described. Note that, in the following description, MPDCCH is assigned in the order of PRB set 0 and PRB set 1 when MPDCCH is assigned to 24 ECCEs. Moreover, PRB set 0 is set to 4 PRB set and PRB set 1 is set to 2 PRB set.

Moreover, when MPDCCH is transmitted with the maximum aggregation level of PRB set 1 (2 PRB set, herein), as in the case of EPDCCH, within PRB set 1 (2 PRB set), MPDCCH is mapped from an OFDM symbol with a low OFDM symbol number in ascending order of frequency while vertically crossing over PRB pairs, and then moves to the next OFDM symbol and is mapped in ascending order of frequency while vertically crossing over PRB pairs, likewise.

Example 1: Mirroring

Figure 12A:
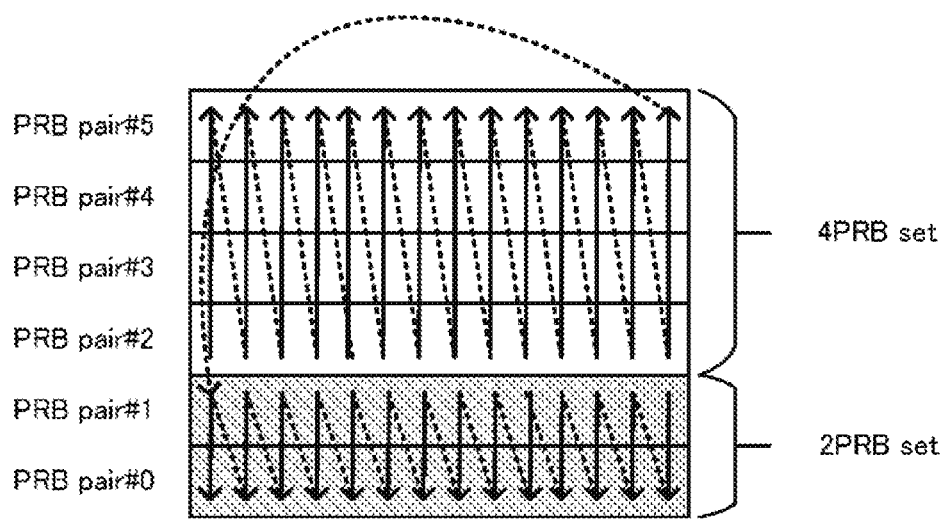
FIG. 12A is a diagram illustrating an example of an MPDCCH mapping method according to Operation Example 6 of Embodiment 3.

In Mirroring, as illustrated in FIG. 12A, when MPDCCH of 24 ECCEs is mapped, within PRB set 1 (2 PRB set), MPDCCH is mapped from an OFDM symbol with a low OFDM symbol number in descending order of frequency while vertically crossing over PRB pairs, and then moves to the next OFDM symbol and is mapped in descending order of frequency while vertically crossing over PRB pairs, likewise. More specifically, in Mirroring, the mapping order of MPDCCH in the frequency direction on each OFDM symbol is inverted between the case of 24 ECCEs and the case of the maximum aggregation level of PRB set 1.

Therefore, since the mapping order of MPDCCH differs within PRB set 1 between the case where MPDCCH of 24 ECCEs is mapped and the case where MPDCCH of the maximum aggregation level of PRB set 1 is mapped, it is made possible to avoid erroneous detection of an aggregation level in an MTC terminal.

Example 2: PRB Pair Shifting

Figure 12B:
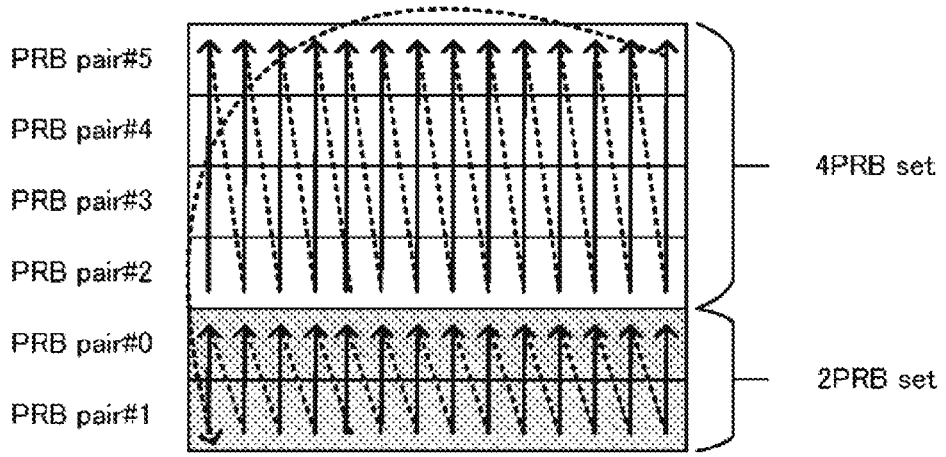
FIG. 12B is a diagram illustrating an example of an MPDCCH mapping method according to Operation Example 6 of Embodiment 3.

In PRB pair shifting, when MPDCCH of 24 ECCEs is mapped, within PRB set 1 (2 PRB set), MPDCCH is mapped while the PRB pair number is shifted. For example, in FIG. 12B, since 2 PRB set is assigned to PRB pair #0 and PRB pair #1, for MPDCCH of 24 ECCEs, mapping of MPDCCH of 24 ECCEs is switched between PRB pair #0 and PRB pair #1 with respect to the case of the maximum aggregation level of PRB set 1.

Accordingly, since the mapping order of MPDCCH within PRB set 1 differs between the case where MPDCCH of 24 ECCEs is mapped and the case where MPDCCH of the maximum aggregation level of PRB set 1 is mapped, it is made possible to avoid erroneous detection of an aggregation level in an MTC terminal.

Example 3: OFDM Symbol Shifting

Figure 12C:
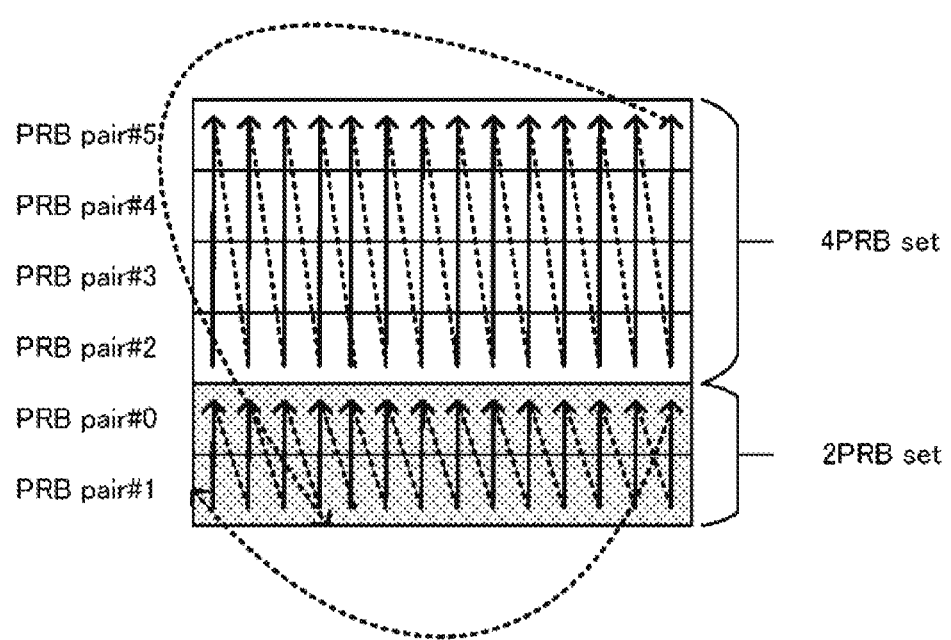
FIG. 12C is a diagram illustrating an example of an MPDCCH mapping method according to Operation Example 6 of Embodiment 3.

In OFDM symbol shifting, when MPDCCH of 24 ECCEs is mapped, within PRB set 1 (2 PRB set), MPDCCH is mapped while the OFDM symbol number is shifted. For example, FIG. 12C illustrates an example in which the OFDM symbol number is shifted by three numbers. That is, within PRB set 1 (2 PRB set), MPDCCH is mapped from OFDM symbol #3 in ascending order of frequency while vertically crossing over PRB pairs, and then moves to the next OFDM symbol and is mapped in ascending order of frequency while vertically crossing over PRB pairs, likewise. Then, when the OFDM symbol to which MPDCCH is mapped becomes the last OFDM symbol, MPDCCH moves to the top OFDM symbol #0 and moves down to OFDM symbol #2.

Accordingly, since the mapping order of MPDCCH within PRB set 1 differs between the case where MPDCCH of 24 ECCEs is mapped and the case where MPDCCH of the maximum aggregation level of PRB set 1 is mapped, it is made possible to avoid erroneous detection of an aggregation level in an MTC terminal.

The specific example of the MPDCCH mapping method to REs has been described, thus far.

As described above, according to the present embodiment, even in a case where terminal 200 erroneously detects the aggregation level of MPDCCH, the PUCCH resource identical to the PUCCH resource of the case where no erroneous detection has occurred can be identified, or terminal 200 can be prevented from erroneously detecting an aggregation level of MPDCCH. Thus, it is made possible to avoid erroneous detection of an ACK/NACK signal in base station 100. Moreover, transmission of an ACK/NACK using a correct PUCCH resource from terminal 200 makes it possible to avoid giving interference to a signal transmitted from another terminal.

Note that, in the operation examples described above, a description has been given of a case where MPDCCH of 24

ECCEs is assigned in order of PRB set 0 and PRB set 1, but MPDCCH of 24 ECCEs may be assigned in order of PRB set 1 and PRB set 0.

Each embodiment of the present disclosure has been described, thus far.

Figure 13A:
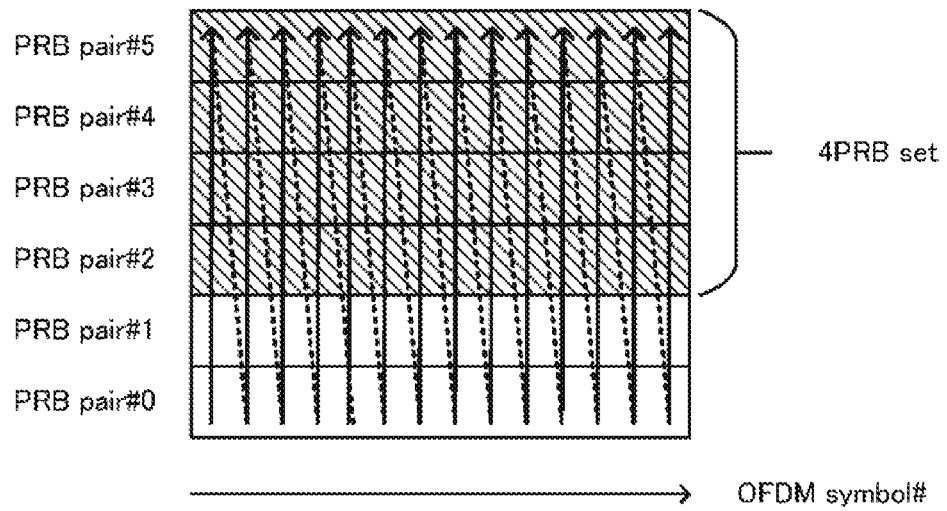
FIG. 13A is a diagram illustrating a 4 PRB set assignment example according to a variation.
Figure 13B:
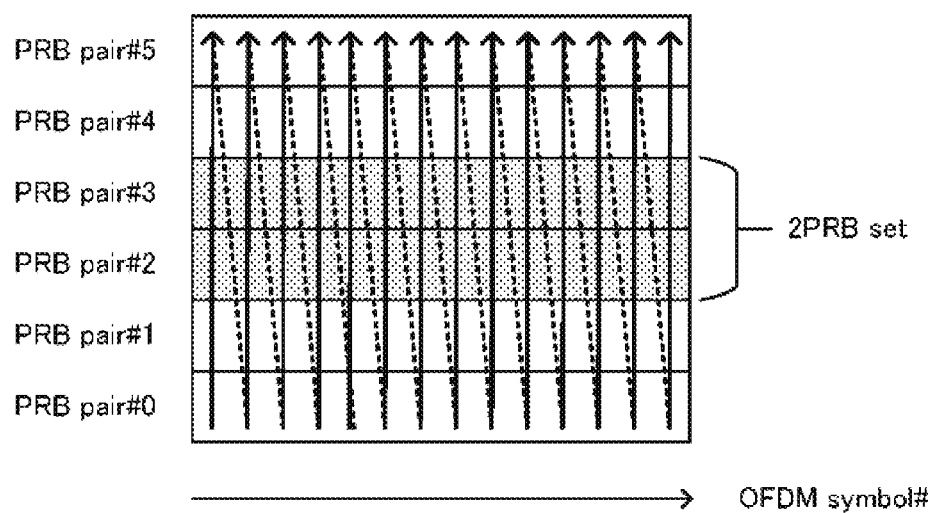
FIG. 13B is a diagram illustrating a 2 PRB set assignment example according to a variation.

Note that, in Embodiments 1 and 2, a description has been given with the example in which 4 PRB set and 2 PRB set are assigned to non-overlapping PRB pairs in Narrowband. However, there may be a case where 4 PRB set and 2 PRB set are assigned to overlapping PRB pairs. FIGS. 13A and 13B illustrate an example in which 4 PRB set is assigned to PRB pairs #2, #3, #4, and #5, and 2 PRB set is assigned to PRB pairs #2 and #3 which are overlapping PRB pairs. Note that, in FIGS. 13A and 13B, an assumption is made that Option 1 (Frequency first) is used for MPDCCH mapping of 24 ECCEs. More specifically, a symbol sequence of MPDCCH of 24 ECCEs in Narrowband is mapped from an OFDM symbol with a low OFDM symbol number in ascending order of frequency while vertically crossing over PRB pairs, and then moves to the next OFDM symbol and is mapped in ascending order of frequency while vertically crossing over PRB pairs, likewise. Even in the case of mapping in which 4 PRB set and 2 PRB set overlap with each other, Operation Example 2 of Embodiment 1 and Operation Example 3 of Embodiment 2 can be applied. For example, in Operation Example 2, when an MTC terminal detects MPDCCH of 24 ECCEs, a PUCCH resource may be identified using N_pucch, 0. Moreover, in Operation Example 3, when an MTC terminal detects MPDCCH of 24 ECCEs, a PUCCH resource may be identified using N_pucch configured in common to a plurality of PRB sets.

Although a description has been given with an example of a case where an aspect of the present disclosure is formed by hardware in each of the embodiments, the present disclosure can be realized by software in cooperation with hardware.

Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

Moreover, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used.

Moreover, if future integrated circuit technology replaces LSIs as a result of the advancement of semiconductor technology or other derivative technology, the functional blocks could be integrated using the future integrated circuit technology. Biotechnology can also be applied.

A base station of the present disclosure includes: a signal assignment section that assigns a downlink control signal to a downlink resource, the downlink control signal including resource allocation information on Physical Downlink Shared Channel (PDSCH): an identifying section that identifies a Physical Uplink Control Channel (PUCCH) resource based on the downlink resource to which the downlink control signal has been assigned, the PUCCH resource being a resource to which an ACK/NACK signal for the PDSCH is assigned; and a signal separating section that separates the ACK/NACK signal included in the identified PUCCH resource from a received signal from a terminal to which the downlink control signal has been transmitted, in which the downlink resource is composed of a plurality of PRB pairs, and any of a first PRB set and a second PRB set is assigned to each of the plurality of PRB pairs, and in a case where the downlink control signal is mapped over the first PRB set and the second PRB set, the identifying section identifies the PUCCH resource, using an offset value configured for any of the first PRB set and the second PRB set.

In the base station of the present disclosure, mutually different offset values are configured for the first PRB set and the second PRB set, respectively, and in a case where the downlink control signal is mapped over the first PRB set and the second PRB set, the identifying section identifies the PUCCH resource, using an offset value configured for a PRB set assigned to a PRB pair having a minimum PRB number, among the first PRB set and the second PRB set.

In the base station of the present disclosure, mutually different offset values are configured for the first PRB set and the second PRB set, respectively, and in a case where the downlink control signal is mapped over the first PRB set and the second PRB set, the identifying section identifies the PUCCH resource, using an offset value configured for a PRB set having a smaller PRB set number among the first PRB set and the second PRB set.

In the base station of the present disclosure, mutually different offset values are configured for the first PRB set and the second PRB set, respectively, and in a case where the downlink control signal is mapped over the first PRB set and the second PRB set, the identifying section identifies the PUCCH resource, using an offset value having a smaller value among the offset values configured for the first PRB set and the second PRB set.

In the base station of the present disclosure, a common offset value is configured for the first PRB set and the second PRB set, and the identifying section identifies the PUCCH resource, using the common offset value.

In the base station of the present disclosure, mutually different offset values are configured for the first PRB set and the second PRB set, respectively, and in a case where the downlink control signal is mapped over the first PRB set and the second PRB set, the identifying section identifies the PUCCH resource, using an offset value configured for a PRB set in which the downlink control signal is mapped first, among the first PRB set and the second PRB set.

In the base station of the present disclosure, the number of PRB pairs to which the PRB set in which the downlink control signal is mapped first is assigned is greater than the number of PRB pairs to which a PRB set in which the downlink control signal is mapped later is assigned.

A terminal of the present disclosure includes: a receiving section that receives a downlink control signal including resource allocation information on Physical Downlink Shared Channel (PDSCH); and an identifying section that identifies a Physical Uplink Control Channel (PUCCH) resource based on a downlink resource to which the downlink control signal has been assigned, the PUCCH resource being a resource to which an ACK/NACK signal for the PDSCH is assigned; and a signal assignment section that assigns the ACK/NACK signal to the identified PUCCH resource, in which the downlink resource is composed of a plurality of PRB pairs, and any of a first PRB set and a second PRB set is assigned to each of the plurality of PRB pairs, and in a case where the downlink control signal is mapped over the first PRB set and the second PRB set, the identifying section identifies the PUCCH resource, using an offset value configured for any of the first PRB set and the second PRB set.

A communication method of the present disclosure includes: assigning a downlink control signal to a downlink resource, the downlink control signal including resource allocation information on Physical Downlink Shared Channel (PDSCH): identifying a Physical Uplink Control Channel (PUCCH) resource based on the downlink resource to which the downlink control signal has been assigned, the PUCCH resource being a resource to which an ACK/NACK signal for the PDSCH is assigned; and separating the ACK/NACK signal included in the identified PUCCH resource from a received signal from a terminal to which the downlink control signal has been transmitted, in which the downlink resource is composed of a plurality of PRB pairs, and any of a first PRB set and a second PRB set is assigned to each of the plurality of PRB pairs, and in a case where the downlink control signal is mapped over the first PRB set and the second PRB set, the PUCCH resource is identified using an offset value configured for any of the first PRB set and the second PRB set.

A communication method of the present disclosure includes: receiving a downlink control signal including resource allocation information on Physical Downlink Shared Channel (PDSCH); identifying a Physical Uplink Control Channel (PUCCH) resource based on a downlink resource to which the downlink control signal has been assigned, the PUCCH resource being a resource to which an ACK/NACK signal for the PDSCH is assigned; and assigning the ACK/NACK signal to the identified PUCCH resource, in which the downlink resource is composed of a plurality of PRB pairs, and any of a first PRB set and a second PRB set is assigned to each of the plurality of PRB pairs, and in a case where the downlink control signal is mapped over the first PRB set and the second PRB set, the PUCCH resource is identified using an offset value configured for any of the first PRB set and the second PRB set.

INDUSTRIAL APPLICABILITY

An aspect of the present disclosure is useful for mobile communication systems.

REFERENCE SIGNS LIST

100 Base station
101 Aggregation level configuration section
102 MPDCCH generation section
103, 209 Error correction coding section
104, 210 Modulation section
105, 211 Signal assignment section
106, 212 Transmitting section
107, 201 Receiving section
108, 208 PUCCH resource identifying section
109, 202 Signal separating section
110 PUCCH receiving section
111, 203 Demodulation section
112, 204 Error correction decoding section
200 Terminal
205 Error determination section
206 ACK/NACK generation section
207 MPDCCH receiving section

The invention claimed is:

1. A communication apparatus comprising:
a receiver which, in operation, receives downlink control information (DCI) mapped to one or more Physical Resource Block (PRB) sets among a plurality of PRB sets;
processing circuitry which, in operation, maps an ACK/NACK signal to a Physical Uplink Control Channel (PUCCH) resource, the ACK/NACK signal being generated based on a detection result of data indicated by the DCI; and
a transmitter which, in operation, transmits the ACK/NACK signal, wherein
the plurality of PRB sets include a first PRB set having a first plurality of ECCEs and a second PRB set having a second plurality of ECCEs different from the first plurality of ECCEs,
for the first PRB set, an index to the PUCCH resource is determined based on a first ECCE index in which the DCI is mapped and which is offset by a higher layer signaling, and determined without adding a PRB value to the first ECCE index,
for the second PRB set, an index to the PUCCH resource is determined based on a sum between (1) the PRB value and (2) a second ECCE index in which the DCI is mapped and which is offset by the higher layer signaling, and
the PRB value is determined based on a total number of ECCEs in the first plurality of ECCEs included in the first PRB set.

2. The communication apparatus according to claim 1, wherein, for the first PRB set or the second PRB set, the index to the PUCCH resource is determined based on a repetition level offset which is common for a same repetition level, the repetition level offset being indicated by the higher layer signaling.

3. The communication apparatus according to claim 1, wherein the DCI is mapped to the one or more PRB sets by prioritizing a frequency direction over a time direction.

4. The communication apparatus according to claim 1, wherein, for the second PRB set, the index to the PUCCH resource is determined for distributed assignment based on: $n_{PUCCH}^{(1,\tilde{p}_0)} = n_{ECCE,q} + \Delta_{ARO} + N_{PUCCH,q}^{(e1)}$ and the PRB value, and wherein, for the second PRB set, the index to the PUCCH resource is determined for localized assignment based on:

$$n_{PUCCH}^{(1,\tilde{p}_0)} = \left\lfloor \frac{n_{ECCE,q}}{N_{RB}^{ECCE,q}} \right\rfloor \cdot N_{RB}^{ECCE,q} + n' + \Delta_{ARO} + N_{PUCCH,q}^{(e1)}$$

and the PRB value.

5. The communication apparatus according to claim 1, wherein, for the second PRB set, the index to the PUCCH resource is determined by assuming the second ECCE index is 0 when the DCI is received on multiple PRB sets.

6. The communication apparatus according to claim 1, wherein the PRB value is selected from multiple values.

7. A communication method, comprising:
receiving downlink control information (DCI) mapped to one or more Physical Resource Block (PRB) sets among a plurality of PRB sets;
mapping an ACK/NACK signal to a Physical Uplink Control Channel (PUCCH) resource, the ACK/NACK signal being generated based on a detection result of data indicated by the DCI; and transmitting the ACK/NACK signal, wherein the plurality of PRB sets include a first PRB set having a first plurality of ECCEs and a second PRB set having a second plurality of ECCEs different from the first plurality of ECCEs, for the first PRB set, an index to the PUCCH resource is determined based on a first ECCE index in which the DCI is mapped and which is offset by a higher layer signaling, and determined without adding a PRB value to a first ECCE index, for the second PRB set, an index to the PUCCH resource is determined based on a sum between (1) the PRB value and (2) a second ECCE index in which the DCI is mapped and which is offset by the higher layer signaling, the PRB value is determined based on a total number of ECCEs in the first plurality of ECCEs included in the first PRB set.

8. The communication method according to claim 7, wherein, for the first PRB set or the second PRB set, the index to the PUCCH resource is determined based on a repetition level offset which is common for a same repetition level, the repetition level offset being indicated by the higher layer signaling.

9. The communication method according to claim 7, wherein the DCI is mapped to the one or more PRB sets by prioritizing a frequency direction over a time direction.

10. The communication method according to claim 7, wherein, for the second PRB set, the index to the PUCCH resource is determined for distributed assignment based on: $n_{PUCCH}^{(1,\tilde{p}_0)} = n_{ECCE,q} + \Delta_{ARO} + N_{PUCCH}^{(e1)}$ and the PRB value, and wherein, for the second PRB set, the index to the PUCCH resource is determined for localized assignment based on:

$$n_{PUCCH}^{(1,\tilde{p}_0)} = \left\lfloor \frac{n_{ECCE,q}}{N_{RB}^{ECCE,q}} \right\rfloor \cdot N_{RB}^{ECCE,q} + n' + \Delta_{ARO} + N_{PUCCH,q}^{(e1)}$$

and the PRB value.

11. The communication method according to claim 7, wherein, for the second PRB set, the index to the PUCCH resource is determined by assuming the second ECCE index is 0 when the DCI is received on multiple PRB sets.

12. The communication method according to claim 7, wherein the PRB value is selected from multiple values.

13. The communication apparatus according to claim 1, wherein the first PRB set and the second PRB set are contiguous PRBs.

* * * * *